United States Patent
Shibutani et al.

(10) Patent No.: US 9,482,332 B2
(45) Date of Patent: Nov. 1, 2016

(54) CAM FOLLOWER AND METHOD FOR PRODUCING CAM FOLLOWER

(71) Applicant: NTN CORPORATION, Osaka (JP)

(72) Inventors: Naoto Shibutani, Shizuoka (JP); Seiji Kanbara, Shizuoka (JP); Shinji Oishi, Shizuoka (JP); Tomoaki Kawamura, Shizuoka (JP); Toshiaki Ensou, Shizuoka (JP)

(73) Assignee: NTN CORPORATION, Osaka (JP)

( * ) Notice: Subject to any disclaimer, the term of this patent is extended or adjusted under 35 U.S.C. 154(b) by 49 days.

(21) Appl. No.: 14/495,150

(22) Filed: Sep. 24, 2014

(65) Prior Publication Data

US 2015/0013420 A1 Jan. 15, 2015

Related U.S. Application Data

(62) Division of application No. 13/384,484, filed as application No. PCT/JP2010/061899 on Jul. 14, 2010.

(30) Foreign Application Priority Data

Jul. 17, 2009 (JP) .................................. 2009-168955
Jul. 23, 2009 (JP) .................................. 2009-172169
Aug. 3, 2009 (JP) .................................. 2009-180779

(51) Int. Cl.
*F16C 33/30* (2006.01)
*F16H 53/06* (2006.01)
(Continued)

(52) U.S. Cl.
CPC ................ *F16H 53/06* (2013.01); *B21K 1/76* (2013.01); *F16C 13/006* (2013.01);
(Continued)

(58) Field of Classification Search
CPC ......... F16H 53/06; B21K 1/76; F16C 33/78; F16C 41/008; F16C 19/463; F16C 13/006; Y10T 29/49295; Y10T 74/2107
See application file for complete search history.

(56) References Cited

U.S. PATENT DOCUMENTS 2,126,912 A 8/1938 Murden
3,266,856 A 8/1966 Steinert et al.
(Continued)

FOREIGN PATENT DOCUMENTS

FR 2229885 12/1974
JP 60-184428 12/1985
(Continued)

OTHER PUBLICATIONS

International Search Report issued Sep. 21, 2010 in International (PCT) Application No. PCT/JP2010/061899.
(Continued)

*Primary Examiner* — David Bryant
*Assistant Examiner* — Jun Yoo
(74) *Attorney, Agent, or Firm* — Wenderoth, Lind & Ponack, L.L.P.

(57) ABSTRACT

A cam follower is constituted by an outer ring which has an outer track surface in its inner circumference; a stud which has an inner track surface opposed to the outer track surface, a flange portion abutting on one side of the inner track surface, a side plate fitting portion and a mounting shaft portion abutting on another side of the inner track surface in this order, and a fiber flow formed continuously from the flange portion to the inner track surface along their outer circumferences; rolling elements which are arranged between the outer track surface and inner track surface; and an inner side plate which is pressed into the side plate fitting portion to work with the flange portion for limiting axial movement of the outer ring and the rolling elements.

4 Claims, 20 Drawing Sheets

(51) Int. Cl.
*F16C 41/00* (2006.01)
*F16C 13/00* (2006.01)
*F16C 19/46* (2006.01)
*F16C 33/78* (2006.01)
*B21K 1/76* (2006.01)

(52) U.S. Cl.
CPC ............ *F16C 19/463* (2013.01); *F16C 33/78* (2013.01); *F16C 41/008* (2013.01); *Y10T 29/49295* (2015.01); *Y10T 74/2107* (2015.01)

(56) References Cited

U.S. PATENT DOCUMENTS

| | | | |
|---|---|---|---|
| 3,528,271 | A | 9/1970 | Di Ponio |
| 3,596,533 | A | 8/1971 | Nightingale |
| 4,113,327 | A | 9/1978 | Koch |
| 5,261,159 | A | 11/1993 | Yasuda et al. |
| 5,286,115 | A | 2/1994 | Toji et al. |
| 5,577,323 | A | 11/1996 | Sawai et al. |
| 6,015,237 | A | 1/2000 | Ogawa |
| 6,017,152 | A | 1/2000 | Ogawa et al. |
| 6,056,444 | A | 5/2000 | Ogawa et al. |
| 6,176,806 | B1 * | 1/2001 | Okubo ................... F16H 15/38 476/42 |
| 7,234,873 | B2 | 6/2007 | Kato et al. |
| 2001/0046339 | A1 | 11/2001 | Miyazaki et al. |
| 2003/0210840 | A1 | 11/2003 | Ogawa |
| 2005/0199446 | A1 | 9/2005 | Nishiwaki et al. |
| 2006/0137637 | A1 | 6/2006 | Abe et al. |
| 2007/0065065 | A1 | 3/2007 | Ohtsuki et al. |
| 2009/0252447 | A1 * | 10/2009 | Hirai ...................... B60B 27/00 384/513 |
| 2010/0239202 | A1 | 9/2010 | Kuroda et al. |

FOREIGN PATENT DOCUMENTS

| | | |
|---|---|---|
| JP | 1-303377 | 12/1989 |
| JP | 6-32809 | 4/1994 |
| JP | 7-42809 | 2/1995 |
| JP | 2513158 | 7/1996 |
| JP | 10-196647 | 7/1998 |
| JP | 2000-320646 | 11/2000 |
| JP | 2005-257036 | 9/2005 |
| JP | 3874479 | 11/2006 |

OTHER PUBLICATIONS

International Preliminary Report on Patentability issued Feb. 16, 2012 in International (PCT) Application No. PCT/JP2010/061899.
U.S. Office Action dated Feb. 20, 2015 issued in counterpart U.S. Appl. No. 13/384,484.
U.S. Office Action dated Apr. 26, 2016 issued in counterpart U.S. Appl. No. 13/384,484.

\* cited by examiner

CAM FOLLOWER AND METHOD FOR PRODUCING CAM FOLLOWER

TECHNICAL FIELD

The present invention relates to cam followers and method for manufacturing cam followers.

BACKGROUND ART

Cam followers are used extensively in indexing mechanisms in indexing devices, cam mechanisms in machine tools, paper feeding mechanisms in printing machines, etc. Specifically, cam followers serve as guides in operation mechanism in a variety of general equipment such as in conveyer systems of lifting and other material handling equipment, in transportation guides of pressing apparatuses, in sliding mechanisms of automatic doors, in fork extraction mechanism in fork lifts, and in many more. In a printing machine, cam followers are used in a shaft motion mechanism for paper retaining claws in a paper feeding system, in ink distribution rollers, in cam mechanisms, and so on.

Generally, a cam follower is a component which includes a cam follower stud (hereinafter simply called "stud"), and a thick-walled outer ring which is rotatably fitted to an end of the stud via rolling elements. The stud supports the outer ring in a cantilever manner, the outer ring makes a rolling movement on a track, and so cam followers are also called track rollers (Patent Literature 1, 2 and 3).

As shown in FIG. 27, a conventional cam follower is composed of a stud 1, and a bearing assembly 2 which is assembled rotatably to an end of the stud 1. The stud 1 has, on its one end, a bearing support portion 3, to which the bearing assembly 2 is rotatably fitted; and on the other end, a mounting shaft portion 4. The bearing support portion 3 has an end facing away from the mounting shaft portion 4, i.e. an outer end portion, where there is a flange portion 5 which serves as an outer end limiter for the bearing assembly 2.

The bearing support portion 3 has another end portion closer to the mounting shaft portion 4, i.e. an inner end portion, where there is a side plate fitting portion 7 which has a diameter reduced by a stepped portion 6. On an axially more inner side as viewed from the side plate fitting portion 7 is the above-described mounting shaft portion 4 which has a slightly more reduced diameter. The mounting shaft portion 4 has its tip portion formed as a thread portion 8. The stud 1 has an oil hole 10 formed therein.

The bearing assembly 2, which rotates on a track surface provided by an outer diameter surface of the bearing support portion 3, includes rollers 9 held by a retainer 11, and an outer ring 12 fitted thereto via the rollers 9. The sideplate fitting portion 7 is press-fitted with an annular, inner side plate 13 which serves as an inner end limiter for the bearing assembly 2. The inner sideplate 13 has the same outer diameter as the flange portion 5.

The outer ring 12 has two end surfaces, one provided with an annular outer end recess 14 and the other provided with an inner end recess 15, both provided coaxially. The outer end recess 14 is fitted with the flange portion 5 with slight radial and axial gaps. The inner end recess 15 is fitted with the inner side plate 13 with slight radial and axial gaps. The flange portion 5 and the inner side plate 13 limit axial movement of the bearing assembly 2.

The cam follower is fixed in a cantilever manner to the apparatus served thereby. The mounting shaft portion 4 of the stud 1 is inserted into a housing of the apparatus so that the thread portion 8 will protrude from inside to outside of the housing, and then a nut is threaded and tightened around the thread portion 8. The rolling element may be an encased roller type which uses a retainer, or a full-type roller bearing which does not use a retainer.

Generally, the stud 1 is made by means of cutting process. A metal rod is cut to form each of the above-described portions. Usually, before the cutting process, one end surface, i.e. an end surface to become an outer end surface of the flange portion, is formed with a hexagonal hole while the other end surface, i.e. an end surface to become an outer end surface of the mounting shaft portion, is formed with a center hole, by forging (Patent Literature 2).

Also, it is public knowledge that the track portion is provided with a lubrication structure provided by an axial oil hole 10 extending from the center of an outer end surface in the mounting shaft portion 4 of the stud 1 to the center of the track surface in the bearing support portion 3. The axial oil hole has an open end provided with a grease nipple (see Patent Literature 1 or 2).

Also, the recesses 14, 15 are provided with seal grooves 16, 17 respectively. These seal grooves 16, 17 are fitted with an outer end lip seal 18 and an inner end lip seal 19 respectively. Each of the lip seals 18, 19 has a lip 21 (see FIG. 28A), which is fitted so as to bend outward (in a direction from inside the bearing assembly 2 toward axially outside and away therefrom). The bent lips 21 are in contact with the outer diameter surfaces of the flange portion 5 and the inner side plate 13, thereby providing sealing.

As illustrated in the drawing, a chamfer 22 is provided along each corner region in the flange portion 5 and in the inner side plate 13 where their outer diameter surfaces meet their respective axial end surfaces, in order to prevent chipping and other problems which can develop at the corner regions.

CITATION LIST

Patent Literature

Patent Literature 1: JP-A 2005-257036 Gazette (FIG. 3, FIG. 4 and FIG. 9)
Patent Literature 2: JP-B 3874479 Gazette (Paragraph 0037)
Patent Literature 3: JP-A H7-42809 Gazette (FIG. 2)
Patent Literature 4: JP-Y 2513158 Gazette

SUMMARY OF INVENTION

Technical Problem

Conventionally, the stud 1 is manufactured as follows: A metal wire material is first cut into a metal rod of a predetermined length. The rod then undergoes cutting process for forming the flange portion 5, the bearing support portion 3, the side plate fitting portion 7, and the mounting shaft portion 4. Further, the rod undergoes a thread cutting process to form the thread portion 8, a drilling process to form the oil hole 10 and other processes as part of a primary processing. Thereafter, the rod undergoes heat treatment, and then a grinding process is performed on the bearing support portion 3 to complete the stud.

It should be noted here that the lip seals 18, 19 may be replaced by washers placed between axially opposed surfaces of the outer ring 12 and the flange portion 5, and between those surfaces of the outer ring 12 and the inner side plate 13; or there is still a different arrangement that both a washer and a seal member are fitted to these places (Patent Literature 4).

Now, the metal rod has a metallographical structure which looks like a bundle or a flow of a multiple number of fibers, and this flow of fibers is called fiber flow. For example, a metal wire which is manufactured by a drawing process exhibits an axial fibrous flow, or a fiber flow, in the direction of length.

If a metal rod having such a consistent axial fiber flow is machined from its outer circumferential surface to form the stud 1, the fiber flow "a" on an outer circumference is severed as illustrated in fine lines in a pictorial representation given in FIG. 29.

As a result of such a cutting process as described, the flange portion 5 formed at an end of the stud 1 has its end surface, which is an end surface closer to the bearing support portion 3, left with a fiber flow "a" severed successively from its outer circumference. Thus, the end surface of the flange portion 5 is constituted by a matrix of severed sections of the fiber flow "a", and for this reason, the flange portion 5 tends to have a fracture along the grain of the fiber flow "a".

Especially, in cases where a relief 20 is formed at the base region of the flange portion 5 to recess into the flange portion 5, there is a problem that the flange base region is weaker.

In the bearing support portion 3, the side plate fitting portion 7 and the mounting shaft portion 4, the fiber flow "a" in their outer circumferences are also severed by the cutting process, so they have the same tendency that fractures will develop in the outer circumferences along the grain of the fiber flow "a".

This means that if the stud 1 is formed by a cutting process, the flange portion 5 and outer circumferences of all the portions will be weaker in strength, and therefore they must be increased in their thickness and diameter in order to achieve a predetermined strength in the stud 1. This results in a problem of increased size of the cam follower, and increased cost as well.

It is therefore a first object of the present invention to provide a compact and low cost cam follower by using a strong stud which does not have severed fiber flow due to cutting process but has a continuous fiber flow throughout all portions.

Next, in the conventional cam follower shown in FIG. 27, the stud 1 and the bearing assembly 2 can erroneously be non-concentric. In such a case, assembling the two with each other will cause the outer end lip seal 18 to be fitted to the outer ring 12 of the bearing assembly 2 to make an eccentric contact to the outer diameter surface of the flange portion 5. Thus, as shown in FIG. 28B, there can be a problem that the lip 21 of the outer end lip seal 18 will be flipped (the outward pointing lip 21 is pressed inward and distorted (see solid lines in the drawing). If the lip 21 is flipped, the tip of the lip 21 can not make proper contact with an intended region in the outer diameter surface of the flange portion 5, leading to insufficient sealing performance.

Flipping of the lip 21 will be elaborated more: As shown in FIG. 28A, the stud 1 and the bearing assembly 2 can be assembled with each other accurately in a coaxial manner (with zero displacement δ). In this case, the outer diameter surface of the flange portion 5 comes inside the lip 21 of the outer end lip seal 18 (see alternate long and short dash lines) smoothly at the time of insertion, so the lip 21 keeps its original outward bend and fits properly onto the outer diameter surface of the flange portion 5.

However, if there is a certain axial displacement δ between the stud 1 and the bearing assembly 2 (as illustrated in alternate long and two short dashes lines in FIG. 28A), the tip of the lip 21 makes contact with the chamfer 22. If insertion continues, the lip 21 is flipped, and as shown in FIG. 28B, the assembly will be imperfect, with the lip 21 not making contact with the outer diameter surface of the flange portion 5. The above-mentioned displacement δ can have a maximum value which is equal to a radial gap in the bearing assembly 2, or 0.06 mm approximately.

Essentially the same problem can affect the inner end lip seal 19 when assembling the inner side plate 13 and the bearing assembly 2 with each other. It should be noted here that in FIG. 27, a reference symbol M represents a marking which indicates a product ID number provided in the outer end surface of the flange portion 5. This will be elaborated later when describing the embodiments.

It is therefore a second object of the present invention to solve the problem of flipped lip seal caused in the assembling process of the cam follower, thereby providing a cam follower which is capable of providing reliable sealing, with the lip seals not being flipped even if there is a certain amount of displacement between the stud and the bearing assembly.

As shown in FIG. 27, cam followers disclosed in the patent literatures 1 and 2 use the bearing support portion 3 of the stud 1 as the track surface for the rollers 9. This makes it necessary to perform heat treatment to give predetermined hardness and strength to the surface, as a secondary processing after various portions have been formed by cutting in the primary processing.

Also, it is imperative to perform finishing processes such as grinding operation to the bearing support portion 3, in order to smoothen the track surface after the heat treatment. However, these secondary and finishing processes increase processing cost of the stud 1.

It is therefore a third object of the present invention to decrease processing cost for the stud in the cam follower for decreased cost of product.

In a case where the stud 1 is not heat-treated in the conventional cam follower described above, there is another problem that an edge of the retainer 11 can contact and damage the inner surface of the flange portion 5 or damage the inner surface of the inner side plate 13 at a time when the retainer 11 wobbles axially, interfering with smooth rotation.

To this problem that the retainer 11 makes contact with the inner surface of the flange portion 5 or with the inner surface of the inner side plate 13, Patent Literature 2 has already disclosed a good solution to place a washer at each end of the retainer 11, for separation from the flange portion 5 and from inner side plate 13. However, washers will not provide sufficient sealing, so the solution makes it necessary to place seal members additionally. Consequently, the solution requires the seal members as shown in the FIG. 27, and the washers, causing a new problem of increased number of parts, which leads to increase in product cost.

It is therefore a fourth object of the present invention to provide a seal member capable of functioning as a seal member and washer, without increasing the number of parts while achieving the third object.

Solution to Problem

In order to achieve the first object, the present invention provides a cam follower constituted by: an outer ring which has an outer track surface in its inner circumference; a stud 31 which has a bearing support portion having an inner track surface opposed to the outer track surface, a flange portion abutting on one side of the bearing support portion, a side plate fitting portion for an inner side plate and a mounting shaft portion abutting on another side of the bearing support portion in this order, and a fiber flow formed continuously from the flange portion to the bearing support portion along their outer circumferential surfaces; rolling elements which are placed between the outer track surface and the bearing support portion; and the inner side plate which is pressed into the side plate fitting portion to work with the flange portion for limiting axial movement of the outer ring and the rolling elements.

The bearing support portion, the side plate fitting portion and the mounting shaft portion become sequentially smaller in diameters. A stepped portion is formed between the bearing support portion and the side plate fitting portion, as well as between the side plate fitting portion and the mounting shaft portion.

The flange portion has a base region formed with a relief which recesses into the flange portion.

Also, the bearing support portion and the side plate fitting portion are bordered by a stepped portion having a rounded corner region.

Also, the flange portion has an outer end surface formed with a hexagonal hole having a bottom with a center hole whereas the mounting shaft portion has an outer end surface formed with a center hole.

The mounting shaft portion is formed with an axial oil supply hole from a tip end surface of the mounting shaft portion to the bearing support portion; and a radial oil supply hole continuing from the axial oil supply hole to the track surface in the bearing support portion. With the above arrangement, the axial oil supply hole is eccentric, being formed in a non-load region of the cam follower.

The mounting shaft portion has a through-shaft portion on a side facing the inner side plate, and a thread portion axially in adjacent to the through-shaft portion via a stepped portion. The stepped portion has a predetermined taper.

In the cam follower according to the present invention, the outer ring has two ends each provided with a lip seal. One of the lip seals makes sliding contact with an outer circumferential surface of the flange portion while the other makes sliding contact with an outer circumferential surface of the side plate.

The stud can be manufactured by the following method, which includes: a cold forging process of forming a primary processed stud which has a basic shape of the flange portion, by setting a metal rod containing a fiber flow formed axially thereof, into a die having a cylindrical cavity of a shape for formation of the bearing support portion, the side plate fitting portion and the mounting shaft portion, and punching the metal rod longitudinally thereof by a punch; and a grinding process of grinding an outer circumferential surface of the primary processed stud to form the flange portion, the bearing support portion, the side plate fitting portion and part of the mounting shaft portion.

The die is formed with a nib for formation of the relief at a base region of the flange portion closer to the bearing support portion.

Also, the die is formed with a predetermined taper for formation of the stepped portion between the through-shaft portion and the thread portion.

The punch has a formation cavity for formation of the flange portion. The pressing operation deforms the metal rod and pushes a portion of the metal into the formation cavity to form the flange portion.

During the cold forging process, formation may be made for the hexagonal hole which has a bottom with a center hole, in an outer end surface of the flange portion; and for the center hole in an outer end surface of the mounting shaft portion.

After the cold forging process, a form rolling process may follow for formation of the thread portion in the mounting shaft portion.

A stud manufactured by the method described above, has a fiber flow formed on its outer circumference, from the flange portion to the track surface of the bearing support portion.

Therefore, a cam follower stud according to the present invention can be made smaller than conventional ones if the required strength is the same.

In order to achieve the second object, a cam follower according to the present invention is constituted by: a stud and a bearing assembly rotatably assembled thereto. The stud has an end portion serving as a bearing support portion for the rotatable fitting of the bearing assembly, and another end portion serving as a mounting shaft portion. The bearing assembly includes an outer ring having an outer end surface provided with an outer end recess and an inner end surface provided with an inner end recess. The bearing support portion has an axial end portion provided with an outer end limiter fitted into the outer end recess, and another axial end portion provided with an inner end limiter fitted into the inner end recess. The outer end limiter and its corresponding recess are provided with an outer end seal placed therebetween. The inner end limiter and its corresponding recess are provided with an inner end seal placed therebetween. With the above-described arrangement, the outer end seal is provided by an outer end lip seal fitted to the outer end recess, and the outer end lip seal has a lip bending axially outward.

When assembling the stud and the bearing assembly with each other, if there is a zero radial displacement between the two, the lip makes contact properly with the outer diameter surface of the outer end limiter, and fulfils its sealing function.

If there is a certain radial displacement between the two, the lip's tip portion makes contact with the rounded portion. Size of a slant angle made on a tangential line drawn at the point of contact depends on the above-mentioned displacement. If the displacement is smaller than a certain value, the slant angle on the tangential line is smaller than aslant angle made of the conventional chamfer, and therefore friction acting on the lip is smaller.

Next, in order to achieve the third object, a cam follower according to the present invention is constituted by: a stud and a bearing assembly rotatably assembled thereto. The stud has one end portion serving as a bearing support portion for the rotatable fitting of the bearing assembly, and another end portion serving as a mounting shaft portion. The bearing assembly is axially limited by an outer end limiter and an inner end limiter provided on respective axial sides of the bearing support portion. The bearing assembly has an outer ring faced by each of the limiters via a sealing member in between. With the above-described arrangement, the stud is made from a primary-processed work piece prepared by a cold forging process or cutting process. The track surface of the bearing assembly and the flange portion are provided by a flanged inner ring prepared by heat-treating and grinding processes, and this inner ring is press-fitted to the bearing support portion.

A cam follower according to the present invention uses the arrangement in the cam follower which is offered to achieve the third object, with an additional arrangement that each of the seal members is provided by a washer and seal member possessing slipping and elastic properties, having an annular portion covering an inner surface of the opposed limiter, and having an outer circumferential edge formed with a bending portion.

Advantageous Effects of Invention

As has been described, the stud used in the cam follower according to the present invention has a fiber flow formed continuously from the flange portion to the bearing support portion along its surface. Therefore, the stud is free from strength degradation caused by severed fiber flow.

Therefore, the stud has an increased strength, and its width and diameter can be made accordingly smaller, making it possible to manufacture more compact studs.

Also, cam followers which utilize the above-described stud can be made compactly as a whole due to the compact size of the stud.

By tapering the stepped portion, stress concentration to this portion is reduced, leading to an increased strength of the stud. This advantage is particularly prominent to tightening torque when the thread portion is installed to target equipment. It was confirmed that the present invention was able to reduce the amount of stress in this portion by up to 50%. It was also confirmed that the amount of stress caused to the cam follower stud by a bending moment during normal use of the cam follower is also reduced.

Further, according to the present invention, the earlier-described chamfer which was conventionally provided in an inner-side corner of the outer end limiter is replaced by a rounded portion. Therefore, even if there is some radial displacement at the time of axially assembling the stud with the bearing assembly, the lip is not easily flipped because friction acting on the lip is now smaller than the friction acting when the chamfer is used due to the structure of the cam follower, as far as the displacement is within a small range up to a maximum radial gap in the bearing assembly. As a result, the seal lip is fitted properly as designed, ensuring reliable sealing.

Still further, according to the present invention, the stud can be manufactured from a primary-processed work piece which is a piece not having received heat treatment and grinding processes conventionally performed after a cold forging process or a cutting process. This eliminates the heat treatment and grinding processes, making it possible to reduce cost of processing. Disadvantages from not performing heat treatment and grinding processes to the stud is eliminated by using a flanged inner ring which has undergone heat treatment and grinding processes and is press-fitted into the bearing support portion of the stud.

Also, since the flange portion is not heat-treated, a washer is required. In the present invention, a conventional seal member is replaced by a washer and seal member which functions as a washer and a seal. As a result, the number of parts is reduced, and it is possible to reduce cost of product.

The above-described flanged inner ring may not necessarily be used. The track surface may be provided by using an inner ring and a side plate. The inner ring and the side plate are available as general purpose parts, so their influence on product cost caused by an increased number of parts is small.

Studs made by a cold forging process are stronger than those made by a cutting process since the fiber flow in the metal rod is not severed.

DESCRIPTION OF EMBODIMENTS

Hereinafter, embodiments of the present invention will be described based on the attached drawings.

[First Embodiment]

Figure 1:
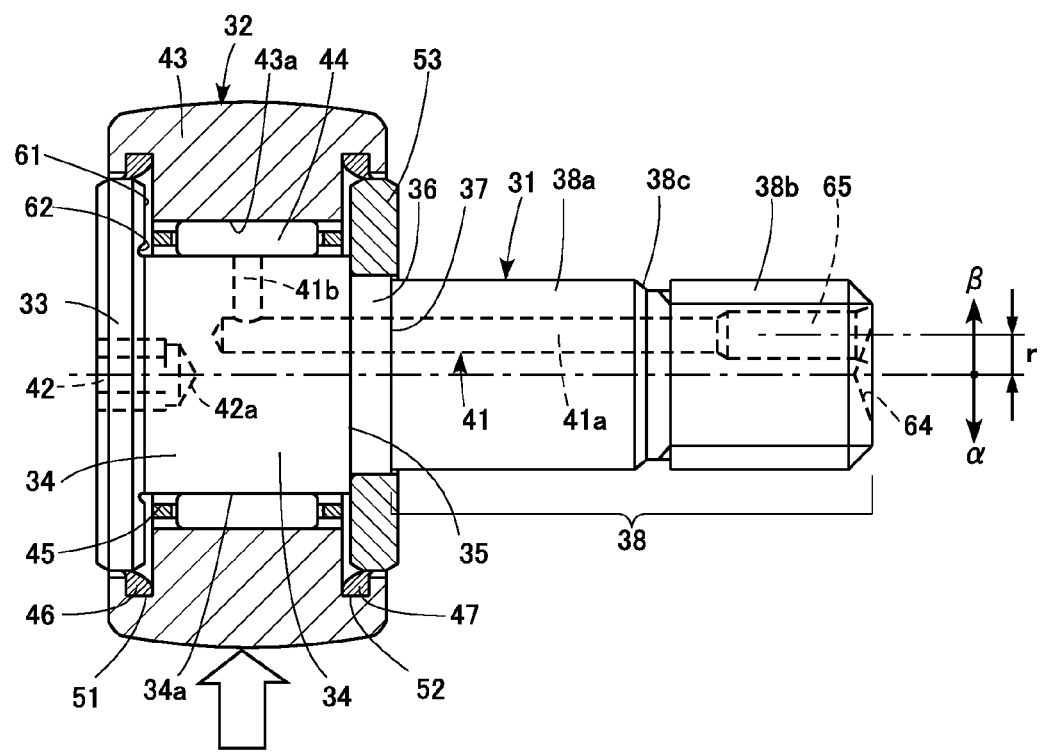
FIG. 1 is a sectional view of a cam follower according to a first embodiment of the present invention.

FIG. 1 shows a cam follower according to a first embodiment, including an outer ring 43 which has an outer track surface 43a in its inner circumference; a stud 31 which has a bearing support portion 34 having an inner track surface 34a opposed to the outer track surface 43a, a flange portion 33 formed on one side abutting on the bearing support portion 34, and a side plate fitting portion 36 and a mounting shaft portion 38 abutting on another side of the bearing support portion 34 in this order, and contains a fiber flow formed continuously from the flange portion 33 to the bearing support portion 34 along their surfaces; rolling elements 44 which are arranged between the outer track surface 43a and the bearing support portion 34; and an inner side plate 53 which is pressed into the side plate fitting portion 36 to work with the flange portion 33 for limiting axial movement of the rolling elements 44.

Figure 29:
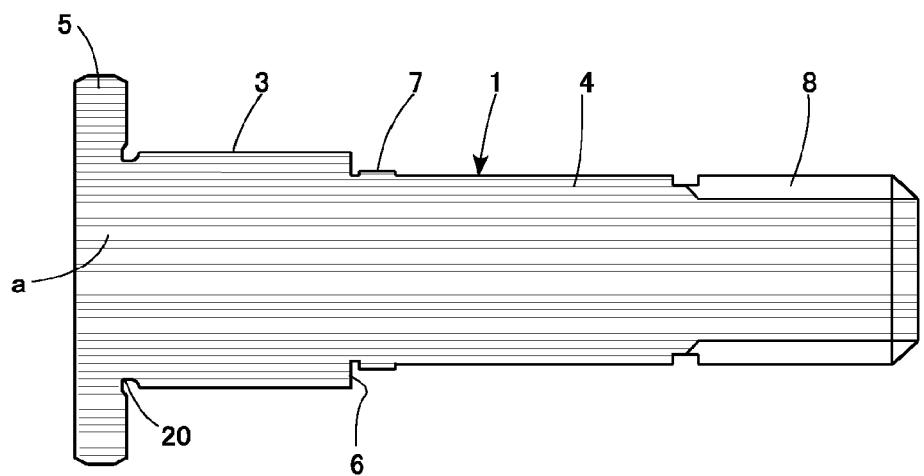
FIG. 29 is a schematic sectional view, as a pictorial representation, of a fiber flow in a stud formed in a conventional cutting process.

The flange portion 33 and the bearing support portion 34 are bordered by a stepped portion 61 which includes a corner region continuing to the bearing support portion 34, where there is formed a relief 62 (see FIG. 3A) recessing (axially) into the flange portion 33. A relief conventionally formed in this region recesses radially (see relief 20 in FIG. 29); However, in the present invention, the relief is made by cold forging process as will be described later, and so the relief must be formed to recess in the direction of pressing (axially) performed during the cold forging process.

The relief 62 is provided in cases where the rolling element 44 is of a full-type roller bearing, in order to avoid a problem that the rollers 44a (see FIG. 3A) will make contact with the corner region of the stepped portion 61.

The bearing support portion 34, the side plate fitting portion 36 and the mounting shaft portion 38 are sequentially smaller in diameter, with a stepped portion 35 formed between the bearing support portion 34 and the side plate fitting portion 36, and a stepped portion 37 formed between the side plate fitting portion 36 and the mounting shaft portion 38.

Figure 3A:
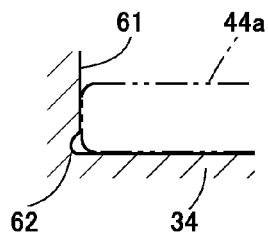
FIG. 3A is an enlarged fragmentary sectional view of the stud in FIG. 2.
Figure 3B:
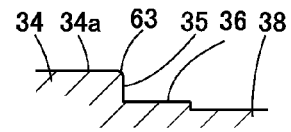
FIG. 3B is an enlarged fragmentary sectional view showing different part of the stud in FIG. 2.
Figure 3C:
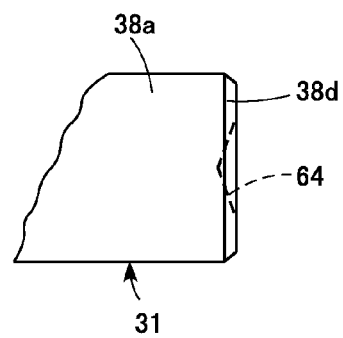
FIG. 3C is a fragmentary front view of a variation of the stud in FIG. 2.

As shown in FIG. 3B, the stepped portion 35 formed between the bearing support portion 34 and the side plate fitting portion 36 has a rounded corner region 63, i.e. having a certain radius (R), in order to eliminate chipping and other damage which can be caused by load concentration.

The flange portion 33 has an outer end surface formed with a hexagonal hole 42 which has a bottom having a center hole 42a. The mounting shaft portion 38 has an outer end surface formed with a center hole 64.

The mounting shaft portion 38 includes a through-shaft portion 38a on the press-fitting side, and a thread portion 38b continuing axially from the through-shaft portion 38a via a stepped portion 38c. The stepped portion 38c has a predetermined taper.

The outer ring 43 has two ends, one provided with a lip seal 46 while the other provided with a lip seal 47. The lip seal 46 slidably contacts an outer circumferential surface of the flange portion 33 whereas the lip seal 47 slidably contacts an outer circumferential surface of the inner side plate 53. The lip seals 46, 47 are coaxial with the outer track surface 43a which is formed in the inner circumferential surface of the outer ring 43 and fitted at more outer positions, into the outer-ring radial seal grooves 51, 52 respectively.

The flange portion 33 and the inner side plate 53 prevent the outer ring 43 and the rolling elements 44 from axial movement. The lip seals 46, 47 prevent lubricant leak from inside, and prevent dusts invasion from outside.

The stud 31 is provided with an oil hole 41, which includes an axial oil hole 41a extending from an outer end surface closer to the thread portion 38b to a center portion of the bearing support portion 34; and a radial oil hole 41b communicating therewith and extending to the track surface 34a. The axial oil hole 41a has an entrance functioning as an oil port 65. A grease nipple is attached when using the oil port 65.

The outer ring 43 of the cam follower is designed with a direction of applied load (see white arrow in FIG. 1). Thus, the stud 31 can be categorized into two regions, a load region α and a non-load region β with respect to its centerline. The axial oil hole 41a is off the centerline toward the non-load region β, by a distance r. This improves strength in the load region α of the stud 31.

FIG. 1 shows a case where the rolling elements provided by the rollers 44 are held by the retainer 45. However, the embodiment is also applicable to full-type roller bearings, i.e., a type which does not use a retainer 45. FIG. 3A shows a roller for this case indicated by a reference symbol 44a.

Other variations may be to eliminate the thread portion 38b from the stud 31, leaving only the through-shaft portion 38a. A chamfer 38d works as a guide when the through-shaft portion 38a is inserted into a mounting hole in the equipment which uses the cam follower. The cam follower is fixed by pressing the through-shaft portion 38a to the mounting hole. As another variation, the hexagonal hole 42 may be replaced by a groove for a flat-blade screw driver.

Also, the lip seals 46, 47 may be eliminated. In this case, the recessing steps 51, 52 are not formed. The oil hole 41 (the oil port 65, the axial oil hole 41a and the radial oil hole 41b) may be eliminated also.

[Second Embodiment]

Figure 4:
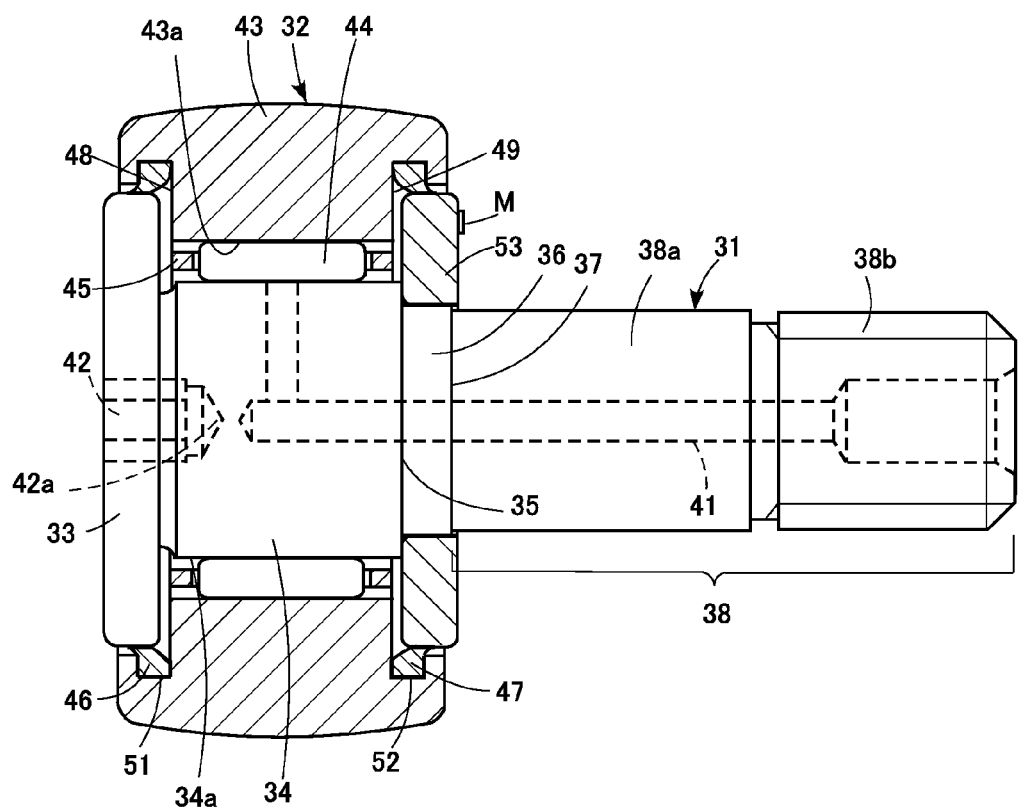
FIG. 4 is a sectional view of a cam follower according to a second embodiment.

FIG. 4 shows a cam follower as a second embodiment, which includes a stud 31 and a bearing assembly 32 assembled rotatably to the stud 31, like conventional cam followers.

The stud 31 has an end which is provided with a flange portion 33 serving as an outer end limiter. Starting from the flange portion 33 and moving in the axial direction, a bearing support portion 34, a stepped portion 35, a side plate fitting portion 36, a slight stepped portion 37, and a mounting shaft portion 38 are provided in this order. The mounting shaft portion 38 includes a through-shaft portion 38a and a tip portion provided by a thread portion 38b. The bearing support portion 34 has an outer diameter surface to which grinding process has been performed for the surface to serve as a track surface 34a.

The thread portion 38b is formed with an oil hole 41 in its center of end surface. The flange portion 33 is formed with a hexagonal hole 42 in its center of end surface. The stud 31 described above is manufactured by cold forging process or cutting process.

The bearing assembly 32 is constituted by an outer ring 43; rollers 44 placed between the outer ring 43 and the track surface in the bearing support 34; a retainer 45 which guides each of the rollers 44; an outer end lip seal 46 fitted to an outer end surface of the outer ring 43; and an inner end lip seal 47 fitted to an inner end surface of the outer ring.

The outer ring 43 has an outer end surface formed with an annular outer-end stepped portion 48; and an inner end region formed with a similar inner-end stepped portion 49, coaxially. The stepped portions 48, 49 are formed with seal grooves 51, 52 respectively, to which the outer end lip seal 46 and the inner end lip seal 47 described above are fitted.

The flange portion 33 is fitted into the outer-end stepped portion 48 of the outer ring 43. Also, the inner-end stepped portion 49 is fitted with the annular inner side plate 53, which is press-fitted to the side plate fitting portion 36 to serve as an inner side limiter. The inner side plate 53 has the same diameter with the flange portion 33, and these two members limit axial movement of the bearing assembly 32.

Figure 5:
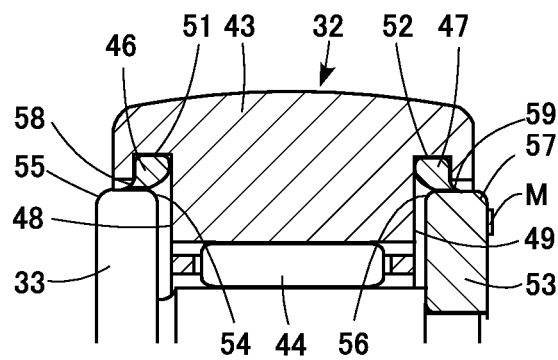
FIG. 5 is an enlarged fragmentary sectional view of the cam follower in FIG. 4.

The flange portion 33 and the inner side plate 53 have their outer diameter surfaces rounded along both of their corner regions. In other words, as shown in FIG. 5, the flange portion 33 has an inner-side rounded portion 54 (see FIG. 7A) which is formed in its inner corner region made by the flange inner side surface (surface facing the bearing assembly 32) and the flange outer diameter surface, and has a predetermined curvature radius and a ninety-degree center angle. An outer-side rounded portion 55, which has the same curvature radius and the same center angle, is formed on an outer corner region made by the outer diameter surface and the outer side surface which is the surface facing away from the inner side surface.

Likewise, the inner sideplate 53 has essentially the same inner-side rounded portion 56 and outer-side rounded portion 57 formed in its inner corner region made by its inner side surface (surface facing the bearing assembly 32) and its outer diameter surface and in its outer corner region made by its outer diameter surface and the outer side surface which is the surface facing away from the inner side surface.

The flange portion 33 has its inner-side rounded portion 54 fitted into the outer-end stepped portion 48 whereas the inner sideplate 53 has its inner-side rounded portion 56 fitted into the inner-end stepped portion 49. As fitted, the flange portion 33 and the inner side plate 53 have their outer diameter surfaces contacted by lips 58, 59 of the outer end lip seal 46 and of the inner end lip seal 47, respectively. In a free state, each of the lips 58, 59 has an outward bend, and an inner diameter surface of the bend makes contact with the outer diameter surface of the counterpart member to provide sealing.

The cam follower according to the second embodiment is as described thus far, and is installed in the same manner as conventional cam followers. Specifically, the through-shaft portion 38a of the mounting shaft portion 38 is inserted into a mount provided in the equipment served by the cam follower, and then the thread portion 38b is threaded and tightened, whereby the bearing assembly 32 is supported in a cantilever manner so that the outer ring 43 can make contact with and roll on a track.

Figure 6:
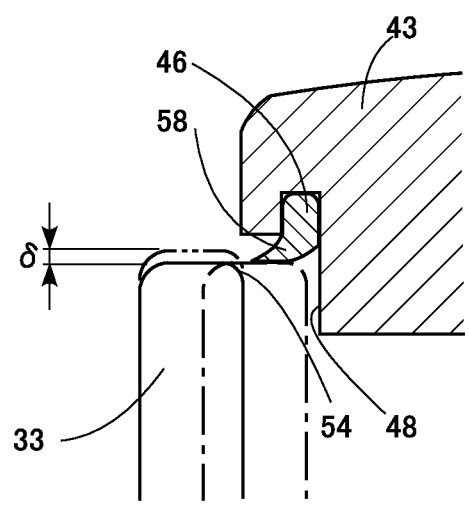
FIG. 6 is a sectional view showing part of an assembling process of the second embodiment.

When assembling the cam follower, if the stud 31 and the bearing assembly 32 are coaxial, there is zero displacement δ (see FIG. 6), and therefore, the lip 58 of the lip seal 46 is not flipped and contacts smoothly with the outer diameter surface of the flange portion 33, attaining a proper state of fitting (see illustration in alternate long and short dash lines).

On the other hand, if there is a displacement δ up to a maximum radial gap (see illustration in alternate long and two short dashes lines) between the axis of the stud 31 and that of the bearing assembly 32, the lip 58 makes contact with the inner-side rounded portion 54.

Figure 7A:
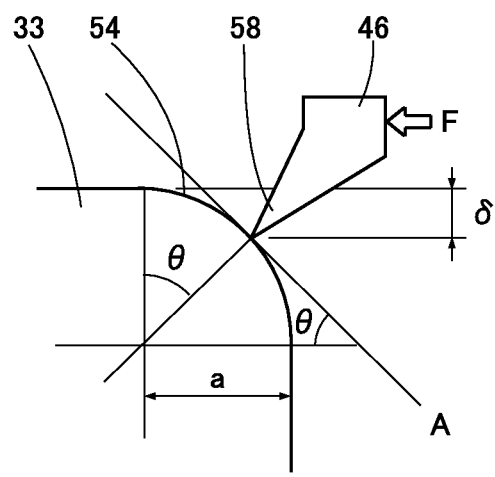
FIG. 7A is an explanatory drawing of the second embodiment.

As described earlier, a conventional flange has a chamfered corner region, and the lip 58 is flipped easily for this reason. In contrast, the flange according to the present invention has a rounded shape 54, which reduces the flipping tendency for reasons to be described below:

FIG. 7A shows an embodiment, where a flange portion 33 has an inner corner region formed with an inner-side rounded portion 54. The inner-side rounded portion 54 has a center angle of ninety degrees, and a curvature radius of a. A lip 58 has its tip making contact at an erroneous position due to a displacement δ. Now, consider a center angle θ of an arc measured from the point of contact made by the lip 58 to the outer diameter surface. A tangential line A drawn to pass the point of contact will give a slant angle which is geometrically equal to θ.

Figure 7B:
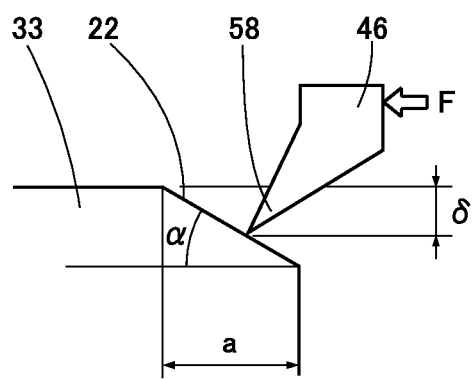
FIG. 7B is an explanatory drawing of a conventional example.

FIG. 7B shows a conventional example formed with a chamfer 22 at the same region. The chamfer 22 has a slant angle α. Also, the chamfer 22 has an axial length which is equal to the above-defined curvature surface a. If the slant angle α is too small, the lip 58 will have a reduced width of contact with the outer diameter surface of the flange portion 33, so the angle α is set to a value not smaller than 30 degrees. Like in the first case described above, the lip 58 has its tip making contact at an erroneous position due to a displacement δ.

Now, assume that in FIGS. 7A and 7B, the inner-side rounded portion 54 and the chamfer 22 have the same friction coefficient, and the two lip seals 46 will receive the same amount of pressing force F, and assume the angle θ and the angle α are in the following relationship: θ<α. Then, the amount of friction acting at the point of contact between the inner-side rounded portion 54 and the lip 58 is smaller than the amount of friction acting at the point of contact between the chamfer 22 and the lip 58. Smaller friction at the point of contact means greater slippage in the pressing direction, and therefore less chance for flipping. On the contrary, greater friction means smaller slippage, and greater chance for flipping.

The center angle θ is determined by the amount of displacement δ. The displacement δ can be a maximum radial gap in the bearing assembly 32, which is typically 0.06 mm, i.e., the angle θ is very small. In comparison, the chamfer 22 has a consistent slant angle α (not smaller than 30 degrees) regardless of the amount of displacement δ. Hence, the following, above-mentioned relationship is true: θ<α. Therefore, the rounded shape according to the present embodiment leads to smaller friction and therefore reduced chance for flipping than chamfers.

Consequently according to the present embodiment, if the displacement δ is as large as the maximum radial gap between the stud 31 and the bearing assembly 32 at the time of assembling these components with each other, it is still possible to complete the insertion smoothly to the contacting surface (outer diameter surface of the flange portion 33) beyond the rounded portion 54, without flipping the lip 58.

After the bearing assembly 32 is inserted, the inner side plate 53 is pressed into the side plate fitting portion 36, and then this inner side plate 53 is fitted into an inner-end stepped portion 49. In this process again, even if there is a certain amount of displacement δ, the lip 59 of the inner end lip seal 47 makes contact with the inner-side rounded portion 56 like in the case as already described, and then stays at a proper position without being flipped.

The inner side plate 53, which is designed to be press-fitted to the side plate fitting portion 36, is formed with a chamfer for smooth insertion, and the chamfer is formed only on one side of its inner diameter hole. For this reason, top-side/bottom-side identification for the inner side plate 53 must be made reliably at the time of press-fitting assembly. In order to eliminate orientation error at the time of this assembling step, an appropriate marking is provided.

Figure 27:
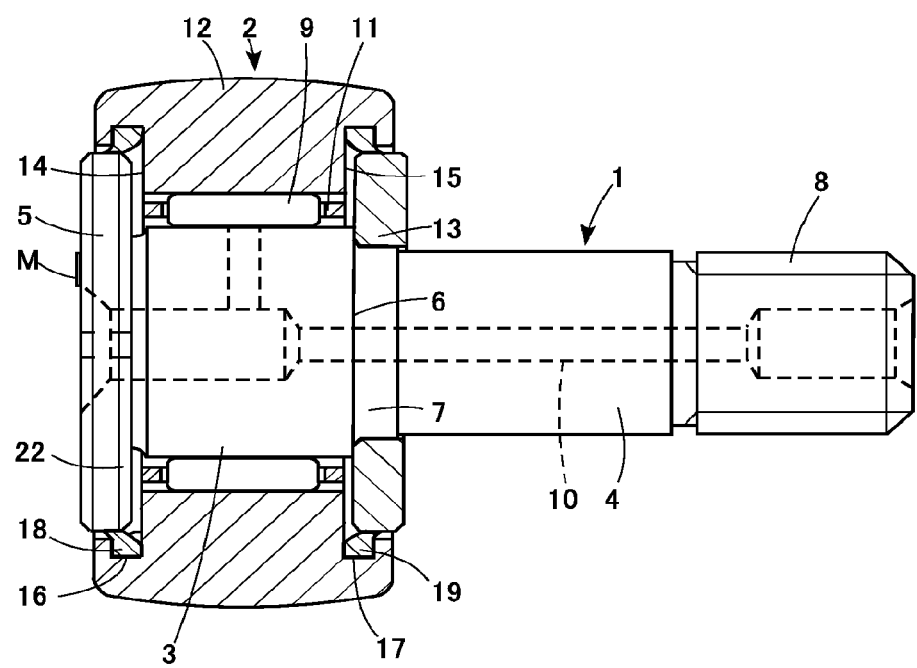
FIG. 27 is a sectional view of a conventional example.
Figure 28A:
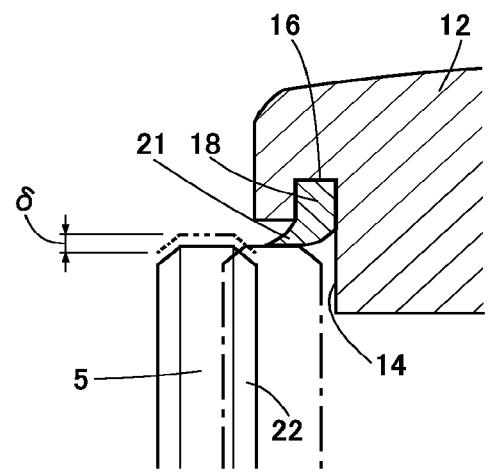
FIG. 28A and FIG. 28B are explanatory drawings illustrating a function of a conventional example.
Figure 28B:
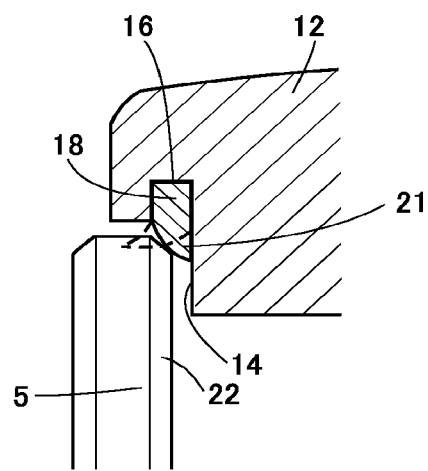

In the present embodiment, the inner side plate 53 has its outer side surface (exposed surface) marked with a product ID marking M (see FIG. 4, FIG. 5) whereas conventionally, such a marking M is made on the outer side surface of the flange portion 33 (see FIG. 27). In the present arrangement, the marking indicates a product ID and the orientation of the inner side plate 53 as well, leading to a reduced number of markings, and a reduced amount of work necessary for marking.

Also, in cases where the stud 31 is manufactured by forging, it is difficult to complete the formation of the chamfer 22 (see FIG. 7B) during the forging process only, so the forging process must be followed by cutting process to form the chamfer 22. However, a rounded shape as in the present embodiment can be completed by forging process only, which means the cutting process can be eliminated here. Similarly, for the inner side plate 53, the rounded shape can be made by first punching, then heat-treating, and then barrel-polishing thereby removing shear droops and surface fractures resulted from the punching process. Therefore, cutting step is not necessary, either, in this case.

It should be noted here that in the present embodiment, both of the flange portion 33 and the inner side plate 53 have rounded shapes in both of their inner and outer corner regions. However, the rounded shape may only be made on their inner corner regions, i.e., in the inner-side rounded portions 54, 56, while the outer corner regions may be chamfered.

[Third Embodiment]

Figure 8A:
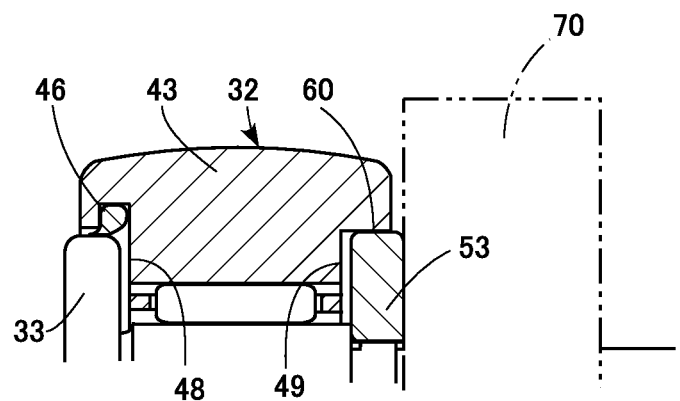
FIG. 8A is a fragmentary sectional view of a third embodiment.

FIG. 8 shows a cam follower as a third embodiment, which is basically the same as the second embodiment, with some differences in the lip seals. Specifically, in the arrangement according to the second embodiment shown in FIG. 4, an outer end lip seal 46 is fitted between the outer end surface of the outer ring 43 and the flange portion 33, and an inner end lip seal 47 is fitted between the inner end surface of the outer ring 43 and the inner side plate 53.

In the third embodiment, however, the inner end lip seal 47 is eliminated, and there is only one lip provided by an outer end lip seal 46 for a purpose of decreasing the number of parts. Grease leakage from around the flange portion 33 is likely to be a problem to adjacent equipment, so reliable grease leakage prevention must be provided for the side facing the flange portion 33 and for this reason, it is impossible to eliminate the outer end lip seal 46.

While eliminating the inner end lip seal 47, alternative sealing is provided by the following arrangement which does not cause increase in the number of parts:

Specifically, since there is no inner end lip seal 47 provided, the gap between the inner diameter surface of the inner-end stepped portion 49 in the outer ring 43 and the outer diameter surface of the inner side plate 53 can be designed to be a micro-gap (0.1 through 0.2 mm) as a minimum gap necessary for rotation. This micro-gap serves as a labyrinth seal 60, providing a certain level prevention against dirt invasion from outside and grease leakage from inside.

Another leakage prevention can be introduced by using a mounting characteristic unique to cam followers: Every cam follower has an equipment-side mounting portion 70 in a vicinity of the inner end surface of the outer ring 43, for screwing an end portion of the stud 31. As shown in the drawing, the equipment-side mounting portion 70 makes a tight fit to the inner side plate 53, very closely to the labyrinth seal 60. Thus, a gap between the outer circumferential surface of the outer ring 43 and the equipment-side mounting portion 70 also functions as a labyrinth seal to stop dirt invasion and grease leakage.

Figure 8B:
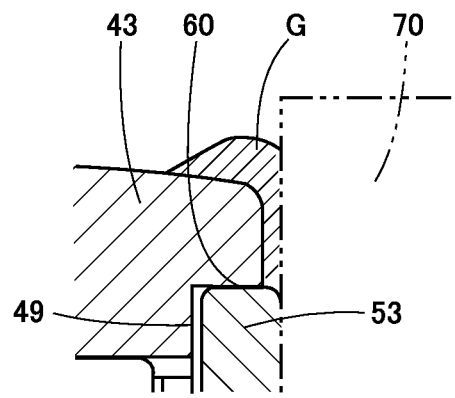
FIG. 8B is a fragmentary sectional view showing an operational state under the arrangement shown in FIG. 8A.

As shown in FIG. 8B, even if there is any leakage of grease G out of the labyrinth seal 60, the grease G will fill the gap between the outer ring 43 and the equipment-side mounting portion 70, thereby eliminating dirt invasion from outside. Further, if the grease G overflows and reaches the rolling surface of the outer ring 43 as illustrated in the drawing, the overflowing amount works as a lubricant between the ring and the track.

In a case where the lip seals 46, 47 are provided on both sides respectively, grease will leak out of both of the lip seals 46, 47 if internal pressure of the bearing assembly 32 exceeds a certain level. On the contrary, in an arrangement like the present embodiment where the inner end lip seal 47 is replaced by formation of the labyrinth seal 60, grease leakage takes place from the labyrinth seal 60 before the inner pressure reaches that high. Thus, it is possible to reliably prevent leakage from the outer end lip seal 46.

It should be noted here that the drawing shows the same configuration as the second embodiment, i.e., the flange portion 33 and the inner side plate 53 have their corner regions made into rounded shapes. However, making a rounded shape in these regions is not mandatory in the third embodiment. These corner regions may be chamfered.

[Fourth Embodiment]

Figure 9A:
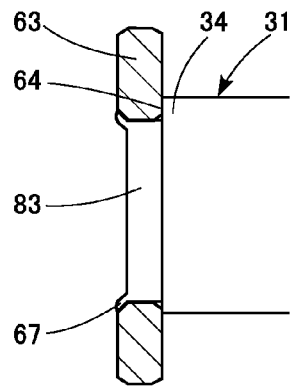
FIG. 9A through FIG. 9D are fragmentary sectional views of various examples as a fourth embodiment.
Figure 9B:
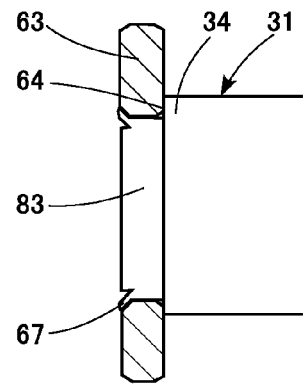
Figure 9C:
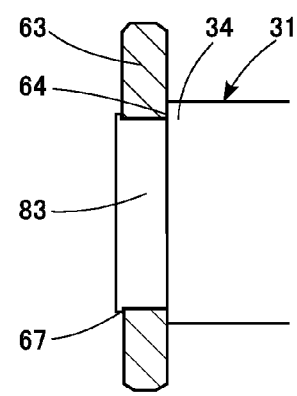
Figure 9D:
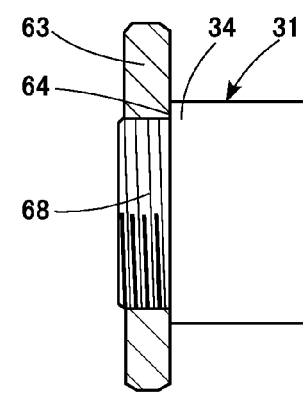
Figure 10:
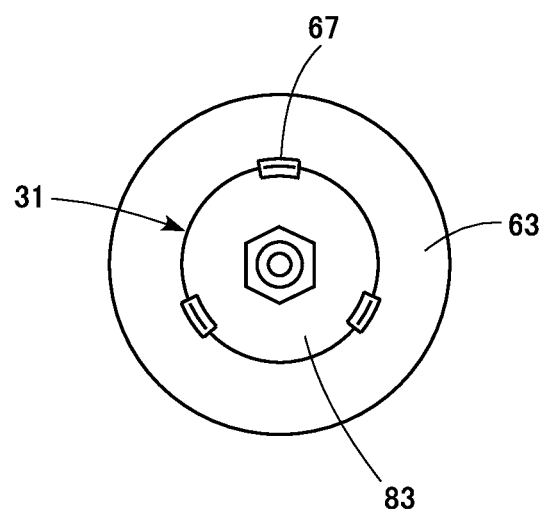
FIG. 10 is a front view of the example in FIG. 9A.
Figure 11:
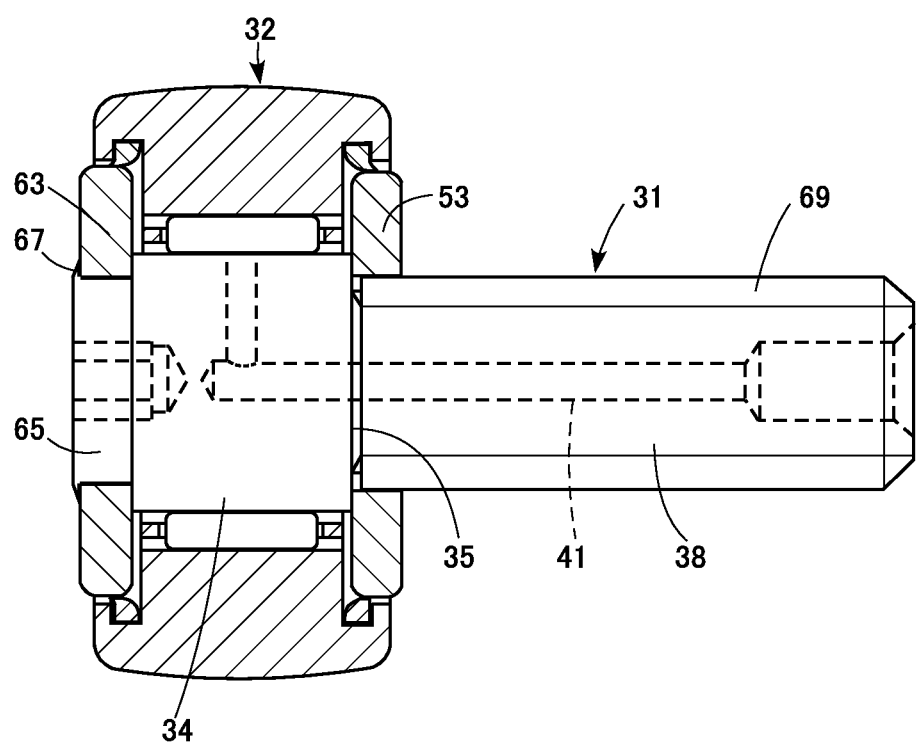
FIG. 11 is a sectional view of still another example of the fourth embodiment.

FIG. 9 through FIG. 11 show a fourth embodiment, which relates to improvement to the stud 31. The stud 31 in the second and the third embodiments has its end portion formed with the flange portion 33 integrally therewith. If the stud 31 is manufactured by cutting process, the raw material metal rod must have an outer diameter large enough for cutting the flange portion 33 therefrom. This means that much of the material must be removed by the cutting process. This has been a factor for high cost of material and machining.

Figure 2:
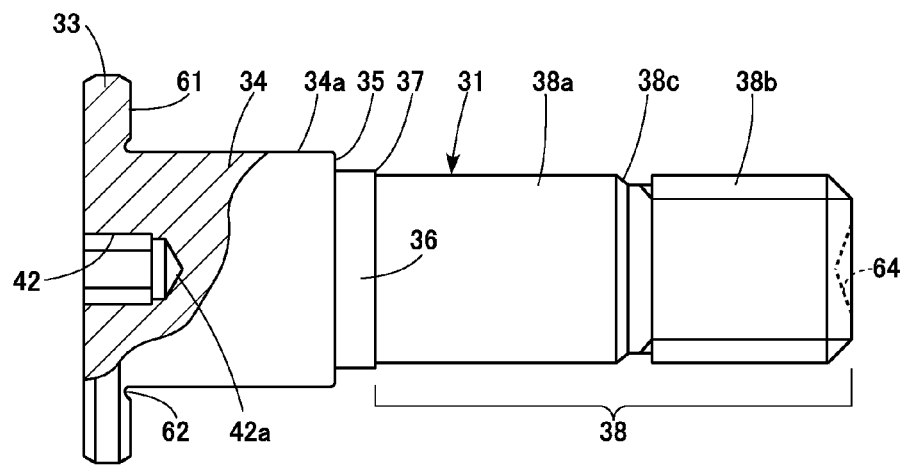
FIG. 2 is a partially cutaway front view of an embodiment of a stud used in the cam follower according to the present invention.

In an attempt to solve this problem, Patent Literature 3 discloses in its FIG. 2, an arrangement where the flange portion 33 is replaced by an annular outer side plate which is loosely fitted to a threaded portion at the stud's tip region and then fastened by a nut. This solution requires a nut, and is accompanied with a disadvantage that the number of parts must be increased.

In the fourth embodiment, an outer side plate 63 is fixed to the stud 31 without any increase in the number of parts.

Specifically, FIGS. 9A through 9C show examples of the stud 31, each having their tip of the bearing support portion 34 provided with a stepped portion 64 to serve as a side plate attaching portion 83 with a reduced diameter. The outer side plate 63 is annular and has the same outer diameter and thickness as the flange portion 33 (see FIG. 4). By making the side plate attaching portion 83 to have the same outer diameter as that of the above-described side plate fitting portion 36 (see FIG. 4), the arrangement makes it possible that a one-size common part is used for whichever of the outer side plate 63 and the inner side plate 53.

Each of FIGS. 9A through 9C shows an arrangement where the outer side plate 63 is fixed to the side plate attaching portion 83 by means of a swage (s) 67 formed at a plurality of locations or entirely along a circumferential edge of the side plate attaching portion 83. FIG. 10 shows a case where the swages 67 are formed at three locations.

As shown in FIG. 9D, the side plate attaching portion may be formed with a thread 68 so that the outer side plate 63 can be fastened by means of threading.

FIG. 11 shows another example for cases where an outer side plate 63 is fastened by the above-described swages 67 (see FIGS. 9A through 9C) or thread connection (see FIG. 9D): In this particular example, a mounting shaft portion 38 reaches a bearing support portion 34, and the mounting shaft portion 38 has its entire length formed with a thread 69. Thus, an inner side plate 53 is threaded into the thread 69 at a tip of the mounting shaft portion 38 and is tightened to the stepped portion of the bearing support portion 34.

It should be noted here that although the drawing shows both the outer side plate 63 and the inner side plate 53 in the fourth embodiment have rounded corner regions in their outer diameter surfaces, these corner regions may be chamfered.

[Durability Test Result]

The following durability test was performed in order to study durability of the above-described design in which the outer side plate 63 is fastened to the stud 31 with the swages 67: Results of the test is shown below:

TABLE 1

Durability Test Result

| Test Conditions | Test Hours | Quantity of Specimen | Outer Side Plate Fall Out |
|---|---|---|---|
| Thrust Force: (P/C = 0.3) × 0.1* Number of Revolutions: 1000 rpm | 200 hours | n = 3 | No fall out or loosening was observed. |

*In the test, an induced thrust force applied to the outer side plate 63 was about 10% of a radial load for a purpose of testing thrust-resistance. Typically, however, induced thrust force is believed to be about 5% of radial load.

In the above, C represents basic net rated load, P represents dynamic equivalent load, and P/C represents load applied to the bearing.

The result of the durability test indicates that fastening the outer side plate 63 by means of the swages 67 will provide the same level of durability as conventional construction.

[Fifth Embodiment]

Figure 12A:
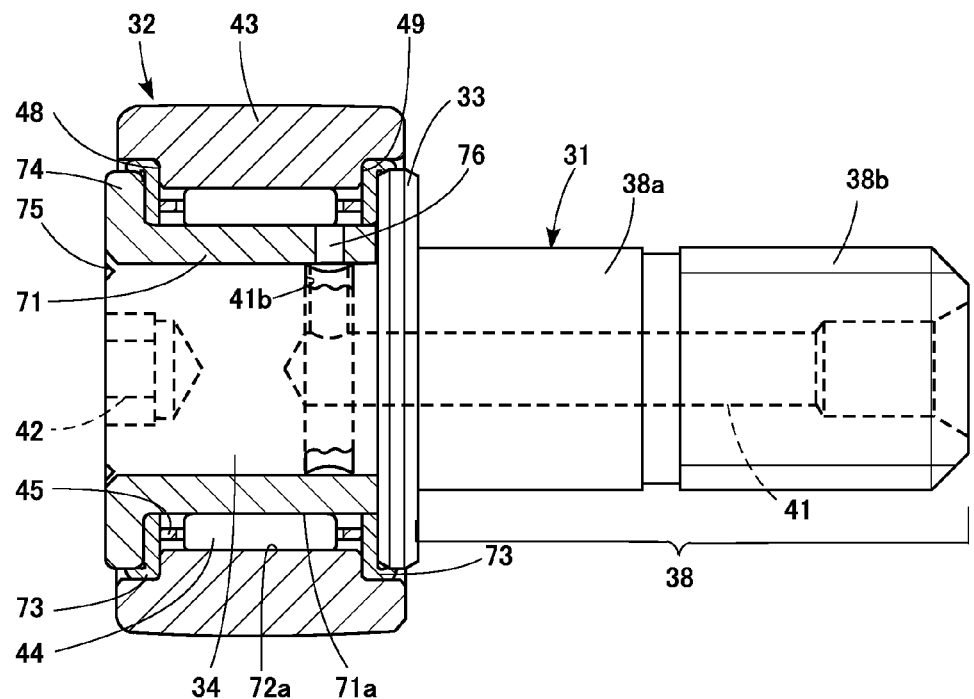
FIG. 12A is a sectional view of a cam follower according to a fifth embodiment.
Figure 12B:
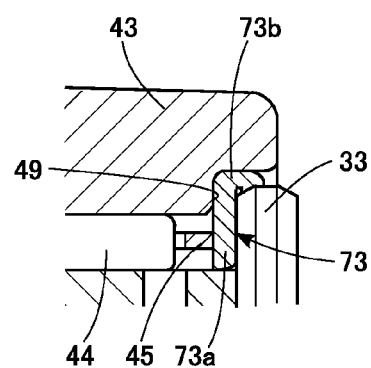
FIG. 12B is a fragmentary sectional view of the cam follower in FIG. 12A.

FIGS. 12A and 12B show a cam follower as a fifth embodiment, which includes a stud 31 and a bearing assembly 32 assembled rotatably to the stud 31, like conventional cam followers.

The stud 31 has, on its one end portion, a bearing support portion 34 to which the above-described bearing assembly 32 is rotatably fitted; and a mounting shaft portion 38 provided on another end. The mounting shaft portion 38 includes a through-shaft portion 38a and a tip portion provided by a thread portion 38b. The bearing support portion 34 and the mounting shaft portion 38 are bordered from each other at an inner end region of the bearing support portion 34, where a flange portion 33 is provided integrally therewith, to serve as an inner end limiter.

From an end surface of the thread portion 38b through a center region of the stud 31, an oil hole 41 is formed to make an L-shaped bend at its tip end. The L-shaped bend at the tip communicates with an oil hole 41b formed to go around the outer circumferential surface. Also, a hexagonal hole 42 is provided at the center of the end surface of the bearing support portion 34.

This stud 31 is manufactured from a primary-processed work piece made of a steel bar which is obtained by first performing thereto a cold forging process using a die and a punch having a molding surface corresponding to an outer surface of the stud 31, and then formed with the oil hole 41. The hexagonal hole 42 can be made during the cold forging process.

The stud 31 formed by a cold forging process as described has a greater strength than those made by cutting process since the original metal bar maintains its fiber flow not severed, and a continuous fiber flow is preserved in the forging process.

Conventionally, the above-described primary processing is followed by the secondary processing, which includes a heat treatment to give hardness and strength to the entire stud 1 (see FIG. 27), and by a finishing processes such as grinding process to smoothen the surface of the bearing support portion 3.

In the present invention, however, the stud 31 is made from a work piece as after the primary-processed work piece, i.e., a piece which has not received the heat treatment nor the finishing processes.

The bearing assembly 32 is constituted by: an inner ring 71; an outer ring 43; rollers 44 interposed between two mutually opposed track surfaces 71a, 72a (see FIG. 12A) of these rings at circumferentially regular intervals; a retainer 45 for guiding each of the rollers 44; and washer-and-seal members 73 fitted to respective end portions of the outer ring 43.

The inner ring 71 has an outer end region formed with an inner ring flange portion 74 integrally therewith to serve as an outer end limiter. The inner ring 71 is pressed into the bearing support portion 34, whereby the bearing assembly 32 is assembled to the stud 31. In order to prevent the bearing assembly 32 from coming off, swages are formed along an inner circumference of the inner ring flange portion 74, at an end region of the stud 31. The swages are indicated by reference symbol 75.

The inner ring 71 has a hole 76. The hole 76 meets the oil hole 41b. The arrangement allows the inner ring 71 to be pressed into the bearing support portion 34 without any limitation posed by circumferential hole position. Since the hole 76 meets the oil hole 41b, inside of the bearing assembly 32 become communicated with the oil hole 41.

Stepped portions 48, 49 are formed to step inward from the outer ring width and to face the track surface 72a on either end surfaces of the outer ring 43. Each of the stepped portions 48, 49 is fitted with the washer and seal member 73. Each washer and seal member 73, may be made of an engineering plastic which has excellent wear resistance, slipping and sealing properties, such as PEEK, POM and PA. Obviously, there is no specific limitation to the material as far as a set of predetermined requirements are met.

It should be noted here that the inner ring 71 and the outer ring 43 are made of a normal steel material, and are heat-treated in the manufacturing process, and their track surfaces 71a, 72a receive a grinding process.

As shown in FIG. 12B, the washer and seal member 73 has an annular portion 73a and a bent portion 73b shaped in an inversed letter of L at its outer circumferential edge. The bent portion 73b is pressed onto an inner diameter surface of the stepped portion 49 in the outer ring 43. The annular portion 73a has a width covering an inner surface of the flange portion 33 or of the inner ring flange portion 74, being fitted axially between one of these flange portions 33 or 74 and a radial end surface of the corresponding opposed one of the stepped portions 48, 49. The annular portion 73a provides sealing between the outer ring 43 and the flange portion 33 or 74, while at the same time working as a washer for reduced friction between each end of the retainer 45 and the corresponding one of the flange portions 33, 74, contributing to smooth rotation of the outer ring 43.

The cam follower according to the fifth embodiment is as described thus far, and is installed in the same manner as conventional cam followers. Specifically, the thread portion 38b is fixed to a part of the equipment served by the cam follower to support the bearing assembly 32 in a cantilever manner so that the outer ring 43 can make contact with and roll on a track. In the rolling movement, the rollers 44 roll on the track surface 71a in the inner ring 71 and the track surface 72a in the outer ring 43. These track surfaces 71a, 72a are heat-treated and therefore have sufficient durability.

Also, in the stepped portions 48, 49 which are formed on the ends of the outer ring 43, each of the stepped portions 48, 49 is opposed by corresponding one of the flange portions 33, 74. The annular portion 73a of the washer and seal member 73 interposed between these members ensures smooth rotation of the outer ring 43 while providing sealing as well. Also, the annular portion 73a of the washer and seal member 73 provides covering on the inner surface in each of the flange portions 33, 74 opposed to the ends of the retainer 45. Therefore, smooth rotation is ensured even if the end(s) of the retainer 45 makes contact. This also eliminates a risk that the flange portion 33 is subject to damage due to lack of heat treatment.

[Sixth Embodiment]

Figure 13:
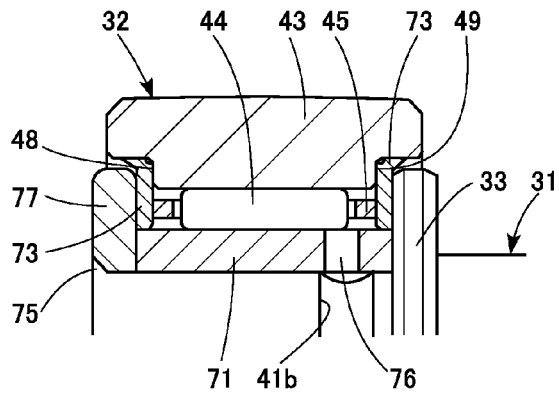
FIG. 13 is a fragmentary sectional view of a cam follower according to a sixth embodiment.

Next, FIG. 13 shows a sixth embodiment, which differs from the previous embodiment in the structure of the inner ring 71. Specifically, the present embodiment employs a cylindrical inner ring 71. An outer end limiter is provided by a separate annular outer side plate 77 which is pressed around an outer diameter surface at a tip-end region of the stud 31, and is retained by a swaged portion 75 formed along its inner surface. The outer side plate 77 has the same diameter as the flange portion 33 and is inserted in the same manner as the previous inner ring flange portion 74 (see FIG. 12A), into the outside stepped portion 48 of the outer ring 43 with a predetermined gap. A washer and seal member 73 is fitted onto the inner surface of the outer side plate.

The inner surface of the outer side plate 77 need not be heat-treated since it is covered by the washer and seal member 73.

[Seventh Embodiment]

Figure 14:
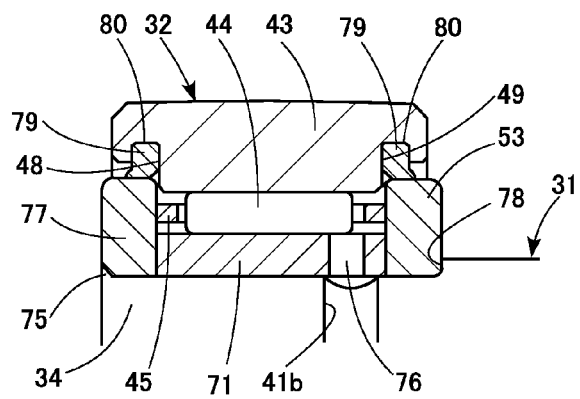
FIG. 14 is a fragmentary sectional view of a cam follower according to a seventh embodiment.

FIG. 14 shows a seventh embodiment which is different from the sixth embodiment (see FIG. 13), in that the flange portion 33 is eliminated and instead, an individual, annular inner side plate 53 prepared as a separate member from the stud 31 is pressed until it makes contact with a stepped portion 78 at an inner end region of the bearing support portion 34, and then each of the inner ring 71 and the outer side plate 77 of the bearing assembly 32 is press-fitted.

In this case, both the inner side plate 53 and outer side plate 77 are heat-treated, so there is no need to provide washers. Therefore, an ordinary seal member 79 is provided for sealing purpose only, in a seal groove 80 in each of the stepped portions 48, 49 in the outer ring 43, so that the lip will make contact with an outer diameter surface of the corresponding outer side plate 77 or inner side plate 73.

The seventh embodiment described thus far does not require the flange portion 33, offering an advantage that the stud 31 has a straighter shape which is easier to form by cold forging process and can contribute to further reduction of product cost.

[Eighth Embodiment]

Figure 15:
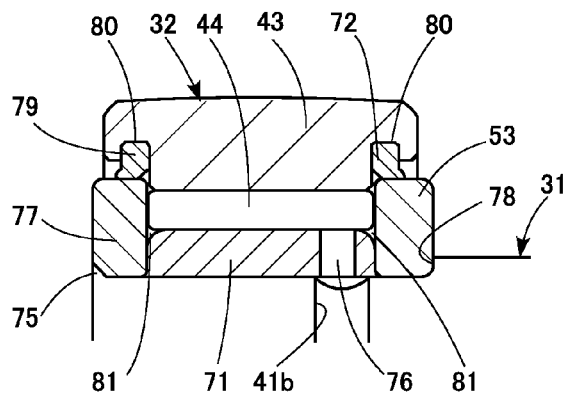
FIG. 15 is a fragmentary sectional view of a cam follower according to an eighth embodiment.

FIG. 15 shows a variation made to the seventh embodiment (see FIG. 14) utilizing rollers 44 which are full-type rollers. Since the variation does not use the retainer 45, there is a possibility for so called scuffing when ends of the rollers 44 make contact with inner surfaces of the outer side plate 77 and of the inner side plate 53.

To avoid this, the embodiment makes use of a cylindrical inner ring 71 which has a rounded end-surface outer-circumference portion on each side, whereby drooped portions 81 are provided between the outer side plate 77 and the inner sideplate 53. The drooped portions 81 can be formed by simple operation of rounding the outer circumferential edges in both end surfaces of the inner ring 71. The drooped portions 81 provide a space between the inner ring 71 and the outer side plate 77 as well as between the inner ring and the inner side plate 53, preventing scuffing by roller ends.

Next, description will be made for methods of manufacturing the stud 31 for use in the cam follower according to the present invention.

The stud 31 for use in the cam follower according to the present invention can be made by following the process described below:

[Forging Process]

Figure 16:
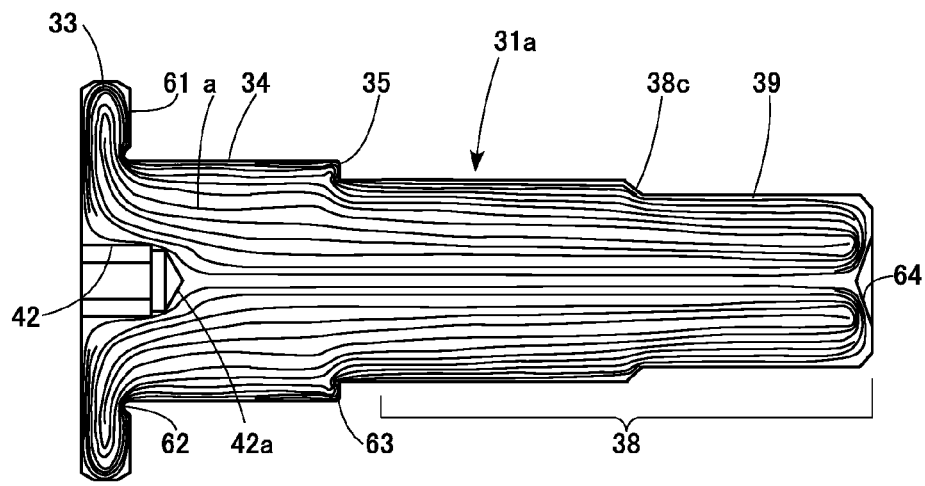
FIG. 16 is a schematic sectional view, as a pictorial representation, of a fiber flow in a primary processed stud formed in a cold forging process.
Figure 17:
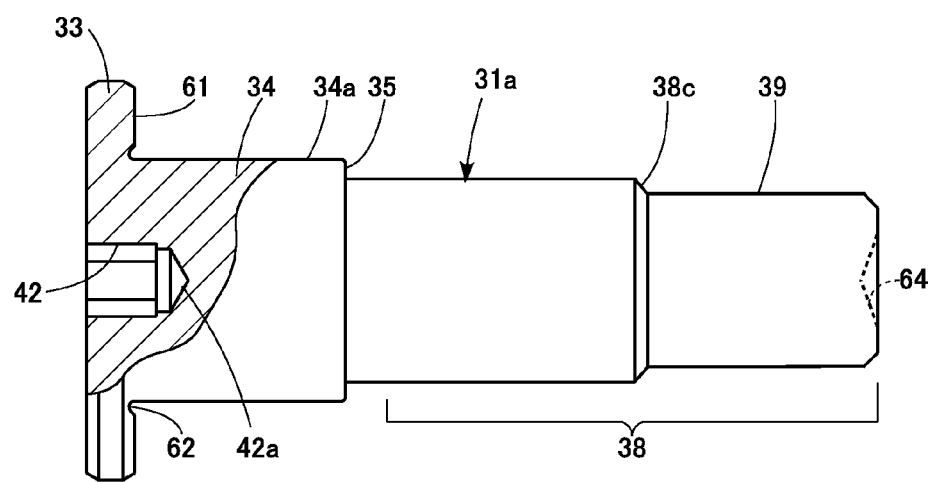
FIG. 17 is a partially cutaway front view of the stud after the primary processing provided by the cold forging process.

First, a primary molded stud 31a shown in FIG. 16 and FIG. 17 is formed by a cold forging process. The primary molded stud 31a does not have the stepped portion 37 which the stud 31 has between the side plate fitting portion 36 and the mounting shaft portion 38. The stepped portion 37 is formed by a grinding process to be described later.

In the cold forging process, a metal rod A which already has an axial fiber flow is set into a die 100 which has a cylindrical cavity for formation of a basic shape of the bearing support portion 34, the side plate fitting portion 36 and the mounting shaft portion 38; and then the metal rod A is pressed in its longitudinal direction by a punch 102, to obtain the primary molded stud 31a which has a basic shape of the flange portion 33.

Figure 18:
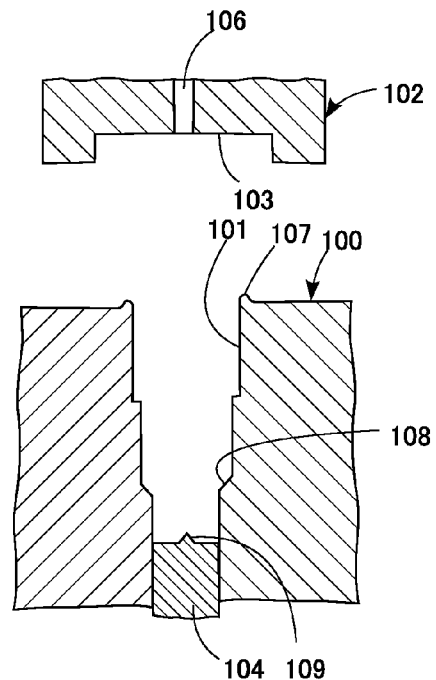
FIG. 18 is a sectional view of a metal mold used in the cold forging process, showing a state where a punch is opened.

FIG. 18 shows a metal mold for this process. When the metal rod A which has a fiber flow "a" in its axial direction undergoes a room-temperature pressure-forming operation provided by the cold forging process, the fiber flow "a" becomes as shown in the schematic drawing given in FIG. 16. Namely, the fiber flow "a" has a denser flux in step-formed regions 61, 35, and is continuous over the outer circumference, from the flange portion 33 to the bearing support portion 34 which is formed with the inner track surface 34a.

As shown in FIG. 18, the metal mold is composed of: a die 100 which has a cylindrical formation cavity 101 for forming the bearing support portion 34 and the mounting shaft portion 38 of the stud 31; and a punch 102 which has a formation cavity 103 in its lower surface, for forming the flange portion 33. A knock-out pin 104 is provided at the center of the die 100 for pushing the molded work piece from the die 100. The knock-out pin 104 has an upper surface formed with a conical projection for forming the center hole. Also, the punch 102 has a guide hole 106 in its center, for a hexagonal hole formation punch 105 used for forming the hexagonal hole 42 in the flange portion 33.

The die 100 also has a nib 107 around an opening of the formation cavity 101, for forming the relief 62 in the flange portion 33.

Also, the die 100 has a taper 108 inside the formation cavity 101 correspondingly to the mounting shaft portion 38, for forming the tapered stepped portion 38c between the mounting shaft portion 38 and the thread portion 38b.

Figure 19:
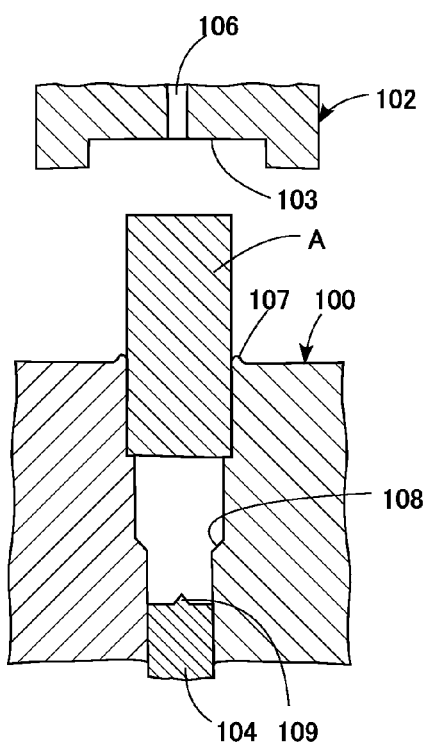
FIG. 19 is a sectional view of the metal mold used in the cold forging process, showing a state where a metal rod is set into a die.
Figure 20:
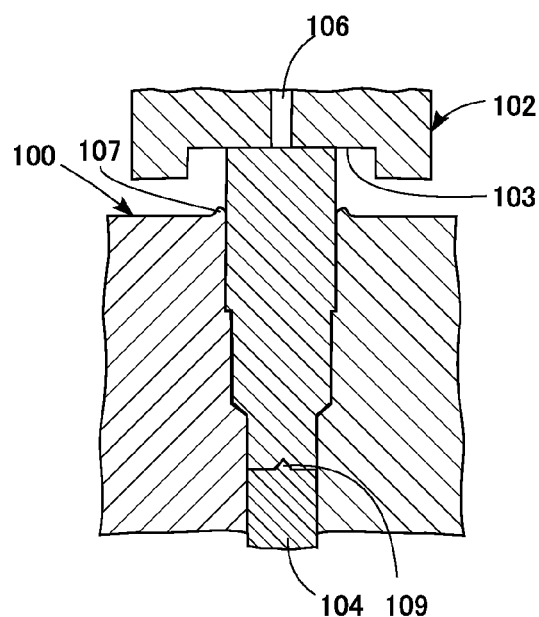
FIG. 20 is a sectional view showing a state where the cold forging process is underway under a pressure applied by the punch.
Figure 21:
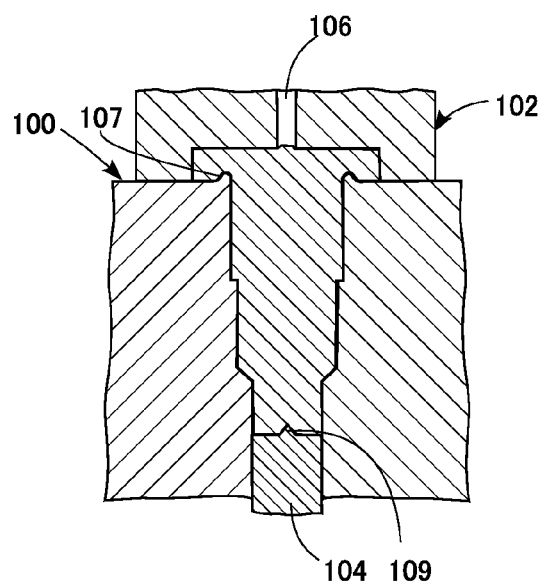
FIG. 21 is a sectional view showing a state where the cold forging process is completed under a pressure applied by the punch.

When making a work piece for the stud 31, i.e., a primary molded stud 31a using the above-described metal mold, first, as shown in FIG. 19, the punch 102 is moved upward with respect to the die 100, and a metal rod A which has a continuous axial fiber flow is set in the die 100. Then, the punch 102 is lowered as shown in FIG. 20 and FIG. 21 to plastically deform the metal rod A into the shape defined by the formation cavity 101 in the die 100 and the formation cavity 103 in the punch 102.

Figure 22:
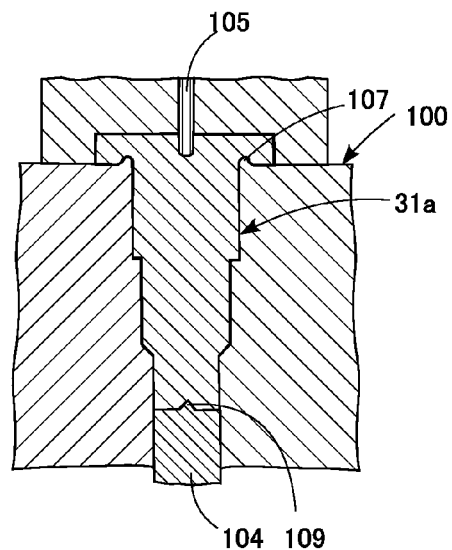
FIG. 22 is a sectional view showing a state where a hexagonal hole is being formed by using a hexagonal hole formation punch of the punch.
Figure 23:
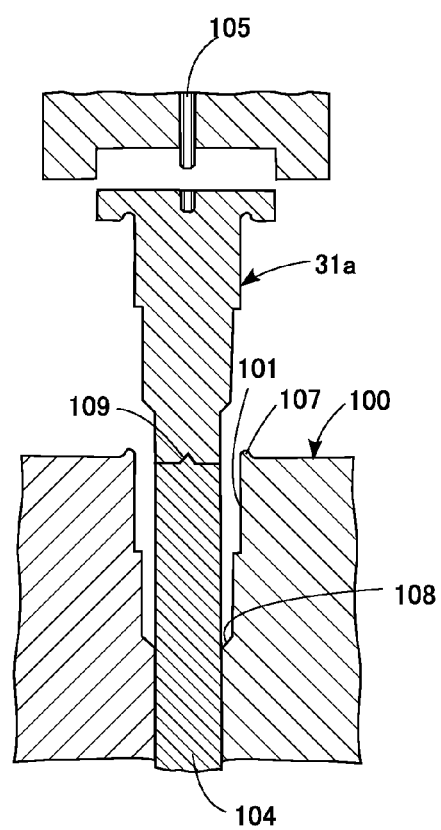
FIG. 23 is a sectional view showing a state after the cold forging process, where the punch is opened to take a primary molded cam follower stud by using a knock-out pin of the die.

Thereafter, as shown FIG. 22, the hexagonal hole formation punch 105 of the punch 102 is pressed onto the flange portion 33 to form the hexagonal hole 42 together with a center hole in the flange portion 33.

Once a primary molded stud 31a for the stud 31 is formed by cold forging process as described above, the hexagonal hole formation punch 105 is removed upward, and the knock-out pin 104 of the die 100 is moved upward, to take the primary molded stud 31a out of the die 100.

The metal rod A may be provided by steels for case hardening for example. However, the material is not limited to these steels, and there is no specific requirement as far as the material does not detract advantageous effects of the present invention.

In the metal mold shown in FIG. 18 through FIG. 23, the formation cavity 103 for the flange portion 33 is formed in a lower surface of the punch 102. However, a formation cavity for the flange portion 33 may be formed in the die 100, so that the metal rod set in the die is pressed by a flat pressing surface of a punch.

FIG. 16 shows a fiber flow "a" appeared in a metal structure on an axial section of the primary molded stud 31a. The flow is generally parallel, with a consistent density around the axis. This indicates that metal around the axis is not very much influenced by the plastic deformation caused by forging. On the contrary, in regions closer to the surface, the fiber flow "a" is altered and is denser. This indicates that regions closer to the surface are strongly influenced by the plastic deformation by forging.

Closer observation of the fiber flow "a" near the surface will reveal that in the flange portion 33 there is a highly dense fiber flow "a" from around the hexagonal hole 42 at the center, along an outer surface of the flange portion 33 toward the radially outer ends. At each radially outer end of the flange portion 33 the flow curves in a shape of inversed letter U, and then makes a return without being interrupted. In more central regions in the width of the flange portion 33, the flow has a relatively low density but continuous, making a return in a more acute curve like a narrowly shaped and inversed letter U.

The denser fiber flow "a" near the outer surface of the flange portion 33 becomes even denser when it comes to the relief 62, where the flow makes a curve along the shape of the recess, and then continues toward the bearing support portion 34 while becoming wider.

It is believed that the flange portion 33 makes a continuous fiber flow "a" by curving in a shape of inversed U because of the axial compression exerted to the tip portion of the metal rod, which created a flow of metal moving radially outward into the formation cavity 103 of the punch 102.

The fiber flow "a" has increased density in the relief 62. This is due to increased compression exerted to this region by the nib 107 of the die 100.

Similarly in the stepped portion 35, the flow follows the rounded shape of the corner region 63, then becomes slightly denser toward the mounting shaft portion 38. In the tapered stepped portion 38c the flow runs gently along the taper toward an uncompleted portion 39.

It is believed that at a tip of the uncompleted portion 39, the metal was driven to move to the tip; then met and shaped by a conical protrusion 109 which was provided for forming the center hole 64 at the bottom; and during this forming process, the fiber flow "a" near the outer circumference and the fiber flow "a" near the center were brought into a generally continuous U-shaped flow.

[Thread Form Rolling Process]

Because of the taper 108 in the die 100, the mounting shaft portion 38 of the primary molded stud 31a thus shaped has a tip portion of a reduced diameter following the tapered stepped portion 38c. A form rolling process is performed to this reduced diameter portion to make a thread portion 38b shown in FIG. 24.

[Grinding Process]

Figure 24:
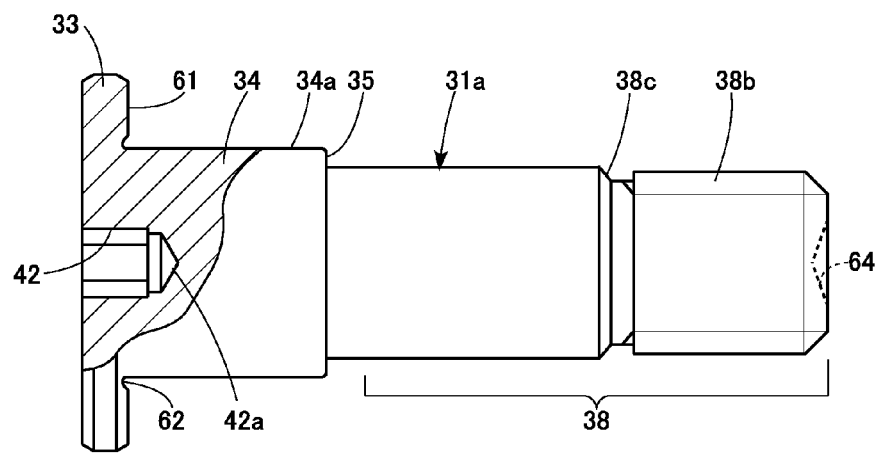
FIG. 24 is a partially cutaway front view of the primary molded stud, which was manufactured by the cold forging process, formed with a thread portion by a form rolling process.

Next, the primary molded stud 31a formed with the thread portion 38b as shown in FIG. 24 undergoes appropriate heat treatment process such as anticarburizing and high-frequency hardening. Thereafter, an angular cylindrical grinding machine is used as shown in FIG. 25 and FIG. 26 to form the stepped portion 37 in the side plate fitting portion 36, to complete the stud 31 as shown in FIG. 2.

Figure 25:
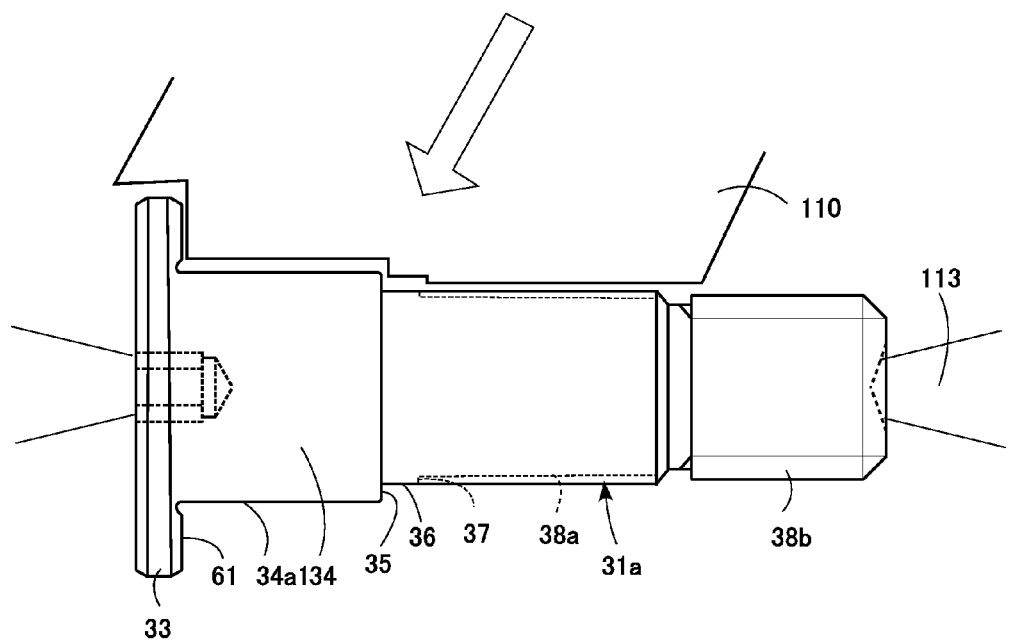
FIG. 25 is a fragmentary front view showing a state where the primary molded stud is being formed with steps in a side plate fitting portion, using an angular cylindrical grinding stone.

In this grinding process, grinding is performed as shown in FIG. 25, to the outer circumferential surface of the flange portion 33, the stepped portion 61 of the flange portion 33 on the side closer to the track 34a; the track 34a in the bearing support portion 34; the stepped portion 35; the side plate fitting portion 36; the stepped portion 37; the rounded corner (Radius: 0.1 through 0.3 mm) between the side plate fitting portion 36 and the stepped portion 37; and the through-shaft portion 38a of the mounting shaft portion 38. The cylindrical grinding stone 110 has a circumferential surface shaped to these portions.

Figure 26:
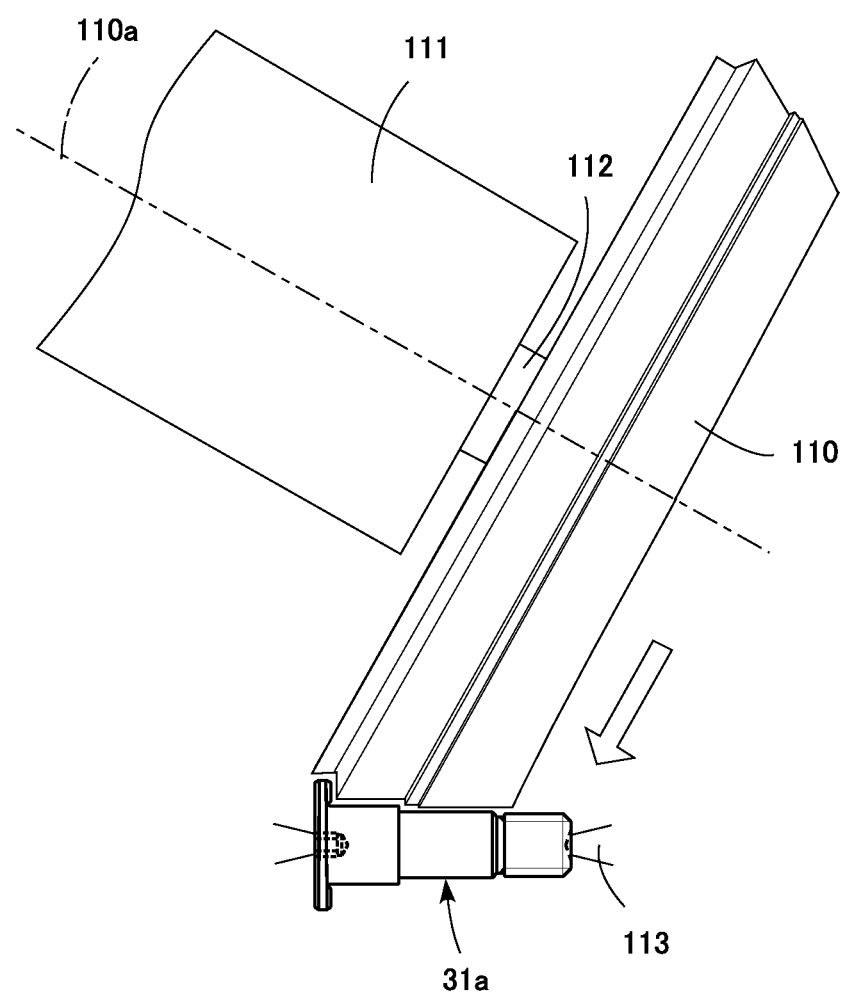
FIG. 26 is an overall front view showing a state where the primary molded stud is being formed with steps in the side plate fitting portion, using the angular cylindrical grinding stone.

As shown in FIG. 26, this angular cylindrical grinding stone 110 has a circumferential grinding surface which is slanted by a predetermined angle to a stone shaft 110a. By applying the stone to the primary molded stud 31a at an angle as indicated by white arrows in FIG. 25 and FIG. 26, grinding in both of the axial and radial directions can be performed in a single step.

In FIG. 26, a reference symbol 111 is a rotation unit, and a reference symbol 112 is a rotation shaft of the cylindrical grinding stone 110. Also, in FIG. 25 and FIG. 26, a reference symbol 113 is a support shaft for the primary molded stud 31a.

The grinding process described above leaves the side plate fitting portion 36 with a width which is slightly smaller than that of the flange portion 33. Also, the through-shaft portion 38a is formed as thick as the housing into which the cam follower is installed. The stepped portion 35 of the side plate fitting portion 36 is only as small as a fitting margin for the inner side plate 53 (see FIG. 1) to be pressed therein. The stepped portion 38c is tapered to reduce stress, and to facilitate insertion of the mounting shaft portion 38 into the mounting hole in the target equipment by eliminating potential difficulty that the cam follower is stuck in the mounting hole.

The flange portion 33 is formed with the hexagonal hole 42 at the center of its end surface. The mounting shaft portion 38 is formed with a shallow center hole 64 at the center of its tip end surface. The hexagonal hole 42 is for inserting an allen wrench to hold the cam follower immovably while a nut threaded around the thread portion 38b is being tightened. The hexagonal hole 42 has a bottom formed with a center hole 42a, which works together with another center hole 64 to rotatably support the stud with a support shaft 113 as shown in FIG. 25, FIG. 26, on the angular cylindrical grinder during the grinding process. The hexagonal hole 42 may be replaced by a groove for a flat-blade screw driver. The center hole 42a is formed also in such a case.

REFERENCE SIGNS LIST 1 stud
2 bearing assembly
3 bearing support portion
4 mounting shaft portion
5 flange portion
6 stepped portion
7 side plate fitting portion
8 thread portion
9 rollers
10 oil hole
11 retainer
12 outer ring
13 inner side plate
14 outer end recess
15 inner end recess
16, 17 seal groove
18, 19 lip seal
20 relief
21 lip
22 chamfer
31 stud
32 bearing assembly
33 flange portion
34 bearing support portion
35 stepped portion
36 side plate fitting portion
37 stepped portion
38 mounting shaft portion
38a through-shaft portion
38b thread portion
38c stepped portion
41 oil hole
41a, 41b oil hole
42 hexagonal hole
43 outer ring
44, 44a roller
45 retainer
46 outer end lip seal
47 inner end lip seal
48 stepped portion
49 stepped portion
51, 52 seal groove
53 inner side plate
54 inner-side rounded portion
55 outer-side rounded portion
56 inner-side rounded portion
57 outer-side rounded portion
58, 59 lip
60 labyrinth seal
61 stepped portion
62 relief
63 outer side plate
64 center hole
65 oil port
67 swage
69 thread
70 equipment-side mounting portion
71 inner ring
71a, 72a track surface
73 washer and seal member
73a annular portion
73b bent portion
74 inner ring flange portion
75 swaged portion
76 hole
77 outer side plate
79 seal member
80 seal groove
81 drooped portion
83 side plate attaching portion
100 die
101 formation cavity
102 punch
103 formation cavity
104 knock-out pin
105 hexagonal hole formation punch
106 guide hole
107 nib
108 taper
109 protrusion
110 cylindrical grinding stone
110a the stone shaft
111 rotation unit
112 rotation shaft
113 support shaft

The invention claimed is:

1. A method for producing a cam follower including an outer ring which has an outer track surface in its inner circumference; a cam follower stud including an inner track surface opposed to the outer track surface, a flange portion abutting on one side of the inner track surface, a side plate fitting portion and a mounting shaft portion in this order abutting on another side of the inner track surface, the cam follower stud containing a fiber flow formed continuously along its surface, from the flange portion to a bearing support portion which has an outer circumference formed with the inner track surface; rolling elements arranged between the outer track surface and the inner track surface; and a side plate pressed into the side plate fitting portion for association with the flange portion in limiting axial movement of the outer ring and the rolling elements, said method comprising:

a cold forging process of forming a primary processed stud which has a basic shape of the flange portion, by setting a metal rod into a die and punching the metal rod longitudinally thereof by a punch, the metal rod containing the fiber flow formed axially thereof, the die having a cylindrical cavity of a shape for formation of a track portion, the side plate fitting portion, and the mounting shaft portion; and a grinding process of grinding an outer circumferential surface of the primary processed stud to form the flange portion, the track portion, the side plate fitting portion, and part of the mounting shaft portion;

wherein the die is formed with a nib for formation of a relief at a base region of the flange portion closer to the track portion; and wherein the die is formed with a predetermined taper for formation of a stepped portion between a through-shaft portion and a thread portion in the mounting shaft portion.

2. The method for producing the cam follower according to claim 1, wherein the punch has a formation cavity for formation of the flange portion, the punching deforming the metal rod and pushing a portion of the metal into the formation cavity to form the flange portion.

3. The method for producing the cam follower according to claim 1, wherein the cold forging process includes formation of a hexagonal hole which has a bottom with a center hole, in an outer end surface of the flange portion; and formation of a center hole in an outer end surface of the mounting shaft portion.

4. The method for producing the cam follower according to claim 1, further comprising a form rolling process following the cold forging process, for formation of the thread portion in the mounting shaft portion.

\* \* \* \* \*